United States Patent
Maier et al.

(10) Patent No.: US 10,250,529 B2
(45) Date of Patent: Apr. 2, 2019

(54) SYSTEMS AND METHODS FOR PERFORMING LOGICAL NETWORK FORWARDING USING A CONTROLLER

(71) Applicant: Big Switch Networks, Inc., Santa Clara, CA (US)

(72) Inventors: Gregor Mathias Maier, Alameda, CA (US); Vishnu Emmadi, Sunnyvale, CA (US); Sudeep Dilip Modi, Milpitas, CA (US); Kanzhe Jiang, Los Altos Hills, CA (US); Kuang-Ching Wang, Central, SC (US); Srinivasan Ramasubramanian, Sunnyvale, CA (US); Mei Yang, Fremont, CA (US); Robert W. Sherwood, Oakland, CA (US); Mandeep Singh Dhami, San Jose, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 648 days.

(21) Appl. No.: 14/337,178

(22) Filed: Jul. 21, 2014

(65) Prior Publication Data

US 2016/0021032 A1   Jan. 21, 2016

(51) Int. Cl.
 *H04L 12/713* (2013.01)
 *H04L 12/717* (2013.01)
 *H04L 12/931* (2013.01)

(52) U.S. Cl.
 CPC .............. *H04L 49/70* (2013.01); *H04L 45/42* (2013.01); *H04L 45/586* (2013.01)

(58) Field of Classification Search
 CPC .......... H04L 45/42; H04L 49/25; H04L 49/70
 See application file for complete search history.

(56) References Cited

U.S. PATENT DOCUMENTS 6,674,756 B1   1/2004   Rao et al.
8,650,618 B2   2/2014   Asati et al.
(Continued)

FOREIGN PATENT DOCUMENTS

WO   2013126195 A1   8/2013

OTHER PUBLICATIONS

Anonymous: "Datasheet: Big Virtual Switch—Network Virtualization with the Open SDN Architecture", Aug. 23, 2013 (Aug. 23, 2013), pp. 1-4, XP055220111, 100 West Evelyn st. Suite 110 Mountain View, CA 94041, USA Retrieved from the Internet: URL:http://www.bigswitch.com/sites/default/filed/sdnresources/bvsdadasheet.pdf [retrieved on Oct. 12, 2015].

(Continued)

*Primary Examiner* — Derrick W Ferris
*Assistant Examiner* — Farhad Ali
(74) *Attorney, Agent, or Firm* — Treyz Law Group, P.C.; Tianyi He; Michael H. Lyons

(57) ABSTRACT

A controller implemented on computing equipment may be used to control switches in a network. End hosts may be coupled to the switches. The controller may generate a virtual network topology of virtual switches, virtual routers, and virtual system routers that are distributed over underlying switches in the network. The controller may form virtual switches from respective groups of end hosts, virtual routers from groups of virtual switches that include virtual interfaces that are coupled to virtual switches, and a virtual system router from groups of virtual routers that includes virtual system router interfaces that are coupled to the virtual routers. The controller may control the virtual network topology by generating respective flow table entries based on identified network policies for each of the virtual routers, virtual system routers, and virtual switches. The controller (Continued)

may control the virtual system routers to route packets between the virtual routers.

22 Claims, 15 Drawing Sheets

(56) References Cited

U.S. PATENT DOCUMENTS

| | | | |
|---|---|---|---|
| 8,660,129 B1 * | 2/2014 | Brendel | H04L 12/4641 370/397 |
| 8,804,748 B2 | 8/2014 | Jia et al. | |
| 8,812,726 B2 | 8/2014 | Khalid et al. | |
| 2008/0198849 A1 | 8/2008 | Guichard et al. | |
| 2010/0254385 A1 | 10/2010 | Sharma et al. | |
| 2013/0238885 A1 * | 9/2013 | Tripathi | G06F 9/4416 713/2 |
| 2015/0271303 A1 * | 9/2015 | Neginhal | H04L 69/22 370/392 |

OTHER PUBLICATIONS

Fang et al., "BP/MPLS VPN Virtual PE; draft-fang-I3vpn-virtual-pe-05.txt", BGP/MPLS VPN Virtual PE; DRAFT-FANG-L3VPN-VIRTUAL-PE-05.TXT, Internet Engineering Task Force, IETF; Standardworkingdraft, Internet Society (ISOC) 4, Rue Des Falaises CH-1205 Geneva, Switzerland, Jul. 4, 2014 (Jul. 4, 2014), pp. 1-26, XP015100224, [retrieved on Jul. 4, 2014].

"OpenFlow Switch Specification", Oct. 14, 2013 (Oct. 14, 2013), XP055111101, Retrieved from the Internet: URL:https://www.opennetworking.org/images/storeis/downloads/sdn-resources/onf-specifications/openflow/openflow-spec-v1.4.0.pdf.

Chiosi et al., "Network Functions Virtulisation—Introductory White Paper Issue 1 Network Functions Virtualisation An Introduction, Benefits, Enablers, Challenges & Call for Action Contribution Organisations & Authors", Oct. 22, 2012 (Oct. 22, 2012), XP055091626, Retrieved from the Internet: URL:http://www/tid.es/es/Documents/NFV_White_PaperV2.pdf [retrieved on Dec. 4, 2013].

Naiksatam et al., U.S. Appl. No. 14/142,283, filed Dec. 27, 2013.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ... | SEND TO PORT 4 |
| * | * | * | * | * | * | 80 | | DROP |

FIG. 4

SYSTEMS AND METHODS FOR PERFORMING LOGICAL NETWORK FORWARDING USING A CONTROLLER

BACKGROUND

This relates to communication networks, and more particularly, to communications networks having network switches that are controlled by a controller.

Packet-based networks such as the Internet and local data networks that are connected to the internet include network switches. Network switches are used in forwarding packets from packet sources to packet destinations. The packets may be sometimes referred to as frames. For example, data is forwarded over layer 2 of the Open Systems Interconnection (OSI) model as frames (e.g., Ethernet frames), whereas data is forwarded over layer 3 of the OSI model as packets (e.g., Internet Protocol packets).

It can be difficult or impossible to configure the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Typically, a network administrator is required to manually configure switches in the network to perform desired forwarding operations on network packets. This process can be time-consuming, tedious, and increasingly challenging, especially with increasing network complexity. It may therefore be desirable to be able to provide improved systems and methods for configuring a network of switches to perform data forwarding operations.

SUMMARY

A controller implemented on computing equipment may be used to control switches in a network. The switches may include physical switches and logical switches such as hypervisor switches. End hosts may be coupled to the switches in the network. The switches may be controlled by the controller for forwarding network packets through the network (e.g., by supplying control messages that are different from the network packets to the switches over control paths).

The controller may generate a virtual network topology of virtual switches, virtual routers, and virtual system routers over the physical and/or hypervisor switches in the network. The controller may form virtual switches from respective groups of end hosts and/or physical routers for routing packets to external networks. A virtual switch may include ports from at least two underlying switches that are coupled to end hosts of the group associated with the virtual switch. The virtual switch may include virtual ports that are coupled to end hosts. The controller may form one or more virtual routers from groups of virtual switches. A virtual router may include virtual interfaces that are coupled to virtual switches. Each virtual interface may be assigned a respective Ethernet address and associated with a respective IP domain. The virtual routers may perform network routing operations in routing network packets between end hosts of the different IP domains.

The controller may form one or more virtual system routers from groups of virtual routers. A virtual system router may include virtual system router interfaces that are coupled to the virtual routers. Each virtual system router interface may be assigned a respective Ethernet address. The virtual system router may perform network routing operations in routing network packets between the virtual routers (e.g., by routing the network packets between the virtual system router interfaces). The virtual switches, virtual routers, and virtual system routers may each be distributed over multiple underlying switches (e.g., physical and hypervisor switches) such that any given switch may be configured to perform functions of one or more virtual switches, virtual routers, and virtual system routers.

The controller may control the virtual routers, virtual system routers, and/or virtual switches to perform network forwarding operations. The controller may configure a virtual router to perform forwarding operations by rewriting Ethernet addresses of selected network packets to redirect the network packets to another virtual router through a corresponding virtual system router. The controller may control the virtual system router to perform forwarding operations by rewriting Ethernet addresses of selected network packets to route the network packets to a desired virtual router (e.g., over a corresponding virtual system router interface). The controller may control the virtual routers, virtual system routers, and virtual switches by generating respective network forwarding rules (e.g., flow table entries) based on network policies specified by a user for each of the virtual routers, virtual system routers, and/or virtual switches. The controller may provide the flow table entries to the virtual routers, virtual system routers, and/or virtual switches for implementing desired network policies (e.g., to the underlying physical and/or hypervisor switches used to implement the virtual system routers, virtual routers, and/or virtual switches).

If desired, the controller may control the first switches, virtual routers, and virtual system router to forward a network packet from a given end host to an external network through a physical router by routing the network packet through the virtual system router (e.g., based on flow table entries generated by the controller). By providing the underlying switches with a logical network topology, the controller may allow for improved flexibility and efficiency for a network administrator to provide and implement desired network policies for forwarding network packets through the network.

Further features of the present invention, its nature and various advantages will be more apparent from the accompanying drawings and the following detailed description.

BRIEF DESCRIPTION OF THE DRAWINGS

FIG. 4 is a diagram of an illustrative flow table of the type that may be used by a packet processing system showing three illustrative types of packet forwarding that may be performed based on the flow table entries of the flow table in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server may interact with each of the control clients over respective network links. The use of a cross-platform controller and corresponding controller clients allows potentially disparate network switch equipment to be centrally managed.

Figure 1:
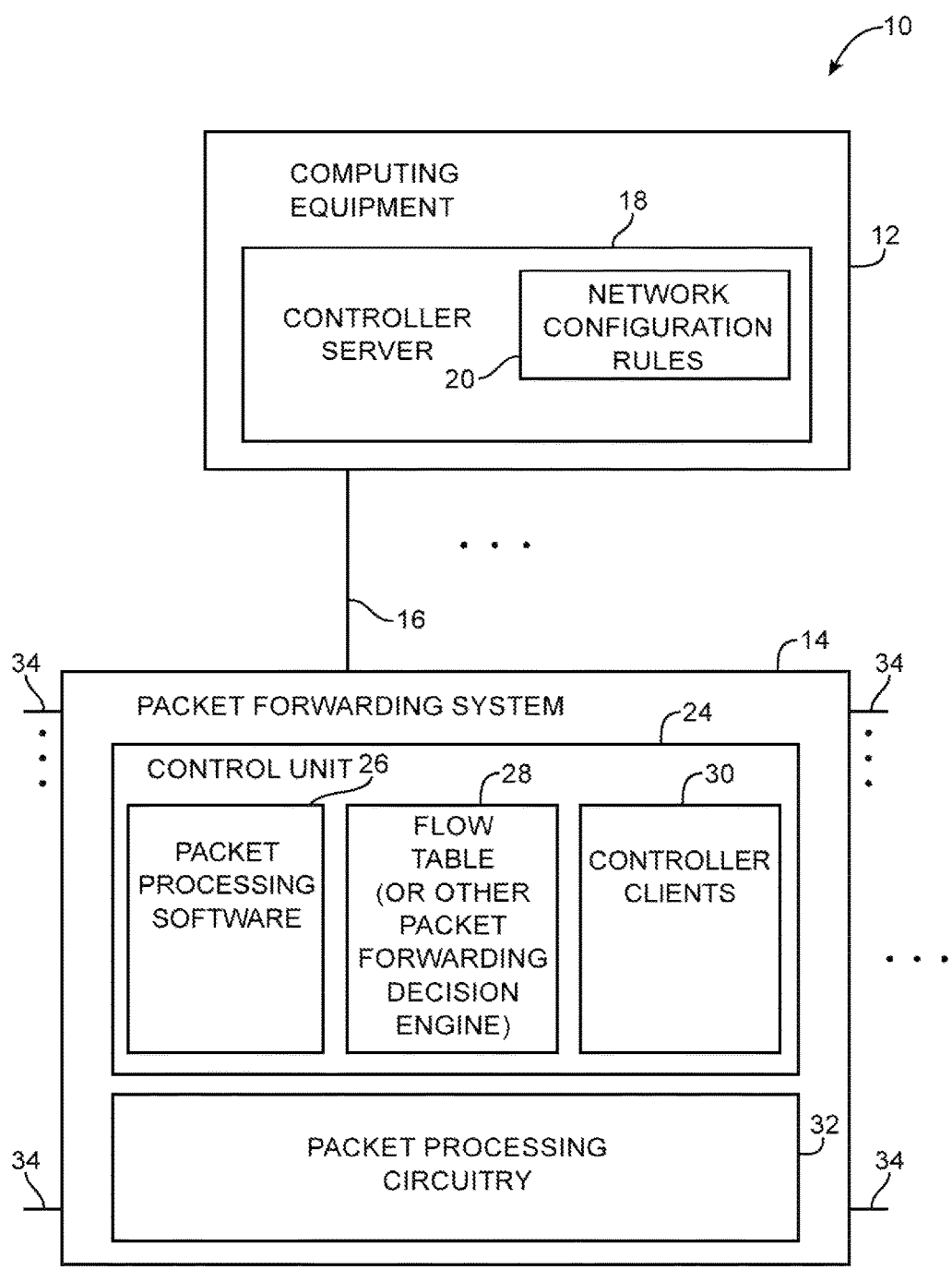
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. As another example, rules 20 may include routing policies identifying network traffic and forwarding operations that are to be performed on the identified network traffic. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Any desired switch may be provided with controller clients that communicate with and are controlled by a controller server. For example, switch 14 may be implemented using a general purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. The controller server may, if desired, be implemented on one or more line cards in the rack-based system, in another rack-based system, or on other computing equipment that is coupled to the network.

Figure 2:
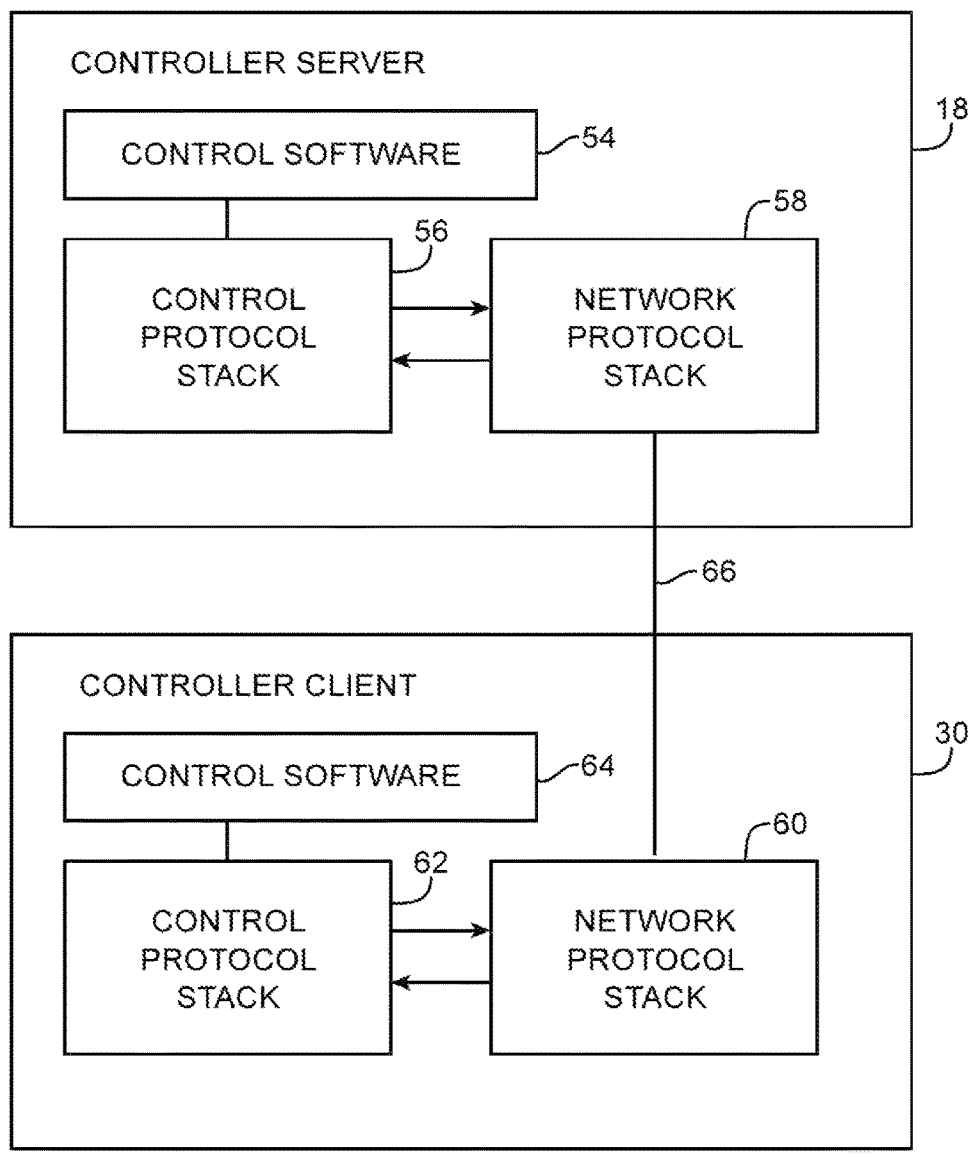
FIG. 2 is a diagram of a controller server and controller client that may communicate over a network connection in accordance with an embodiment of the present invention.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 3:
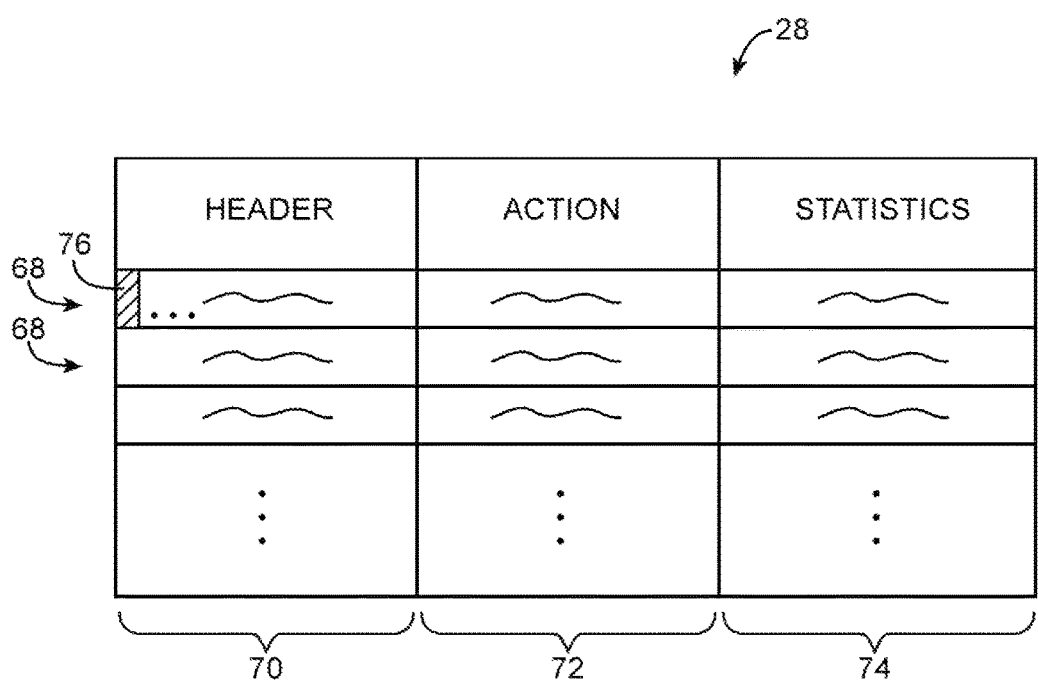
FIG. 3 is a diagram of an illustrative flow table of the type that may be used by a packet processing system in accordance with an embodiment of the present invention.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. The modify-field actions may be used in rewriting portions of network packets that match the flow table entry.

FIG. 4 is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 4 table directs the switch in which the flow table entry is operating to perform Ethernet switching. In particular, incoming packets with matching Ethernet destination addresses are forwarded to port 3.

The entry of the second row of table of FIG. 4 illustrates how a switch may be configured to perform internet routing (i.e., packets are forwarded based on their destination IP address).

The third row of the table of FIG. 4 contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 5:
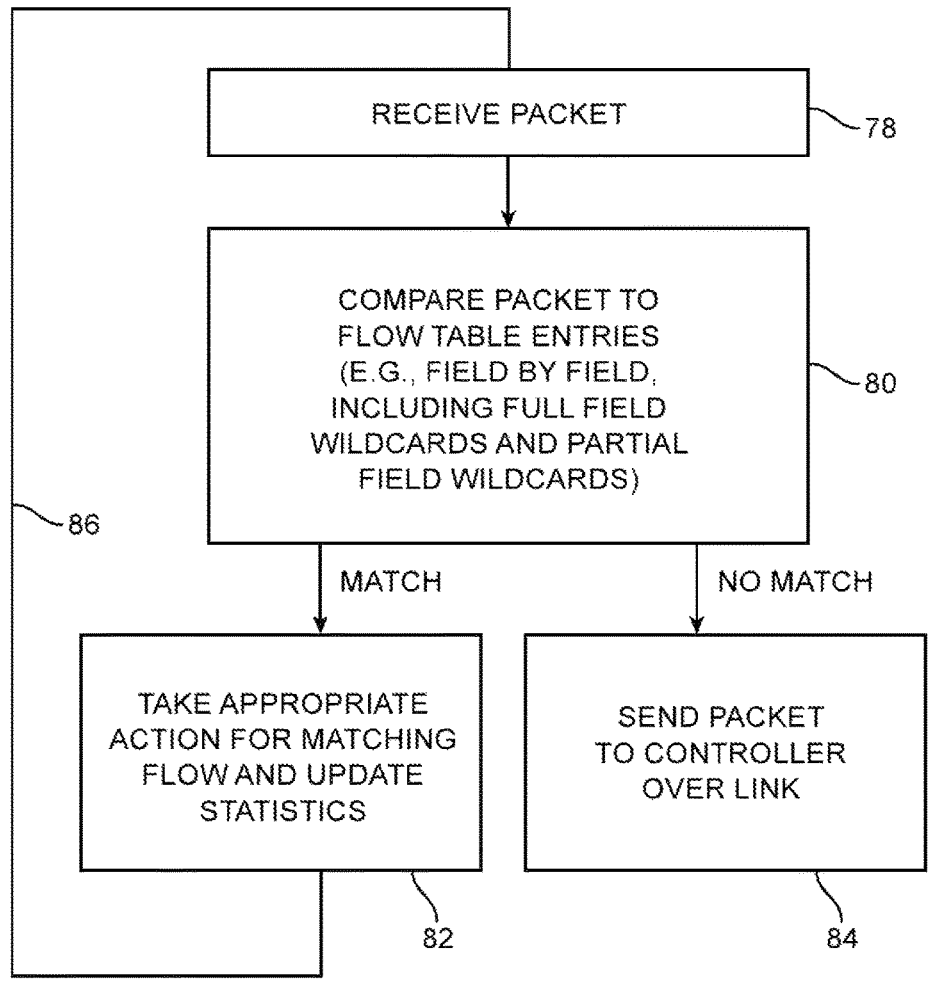
FIG. 5 is a flow chart of illustrative steps involved in processing packets in a packet processing system in accordance with an embodiment of the present invention.

Illustrative steps that may be performed by switch 14 in processing packets that are received on input-output ports 34 are shown in FIG. 5. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 6:
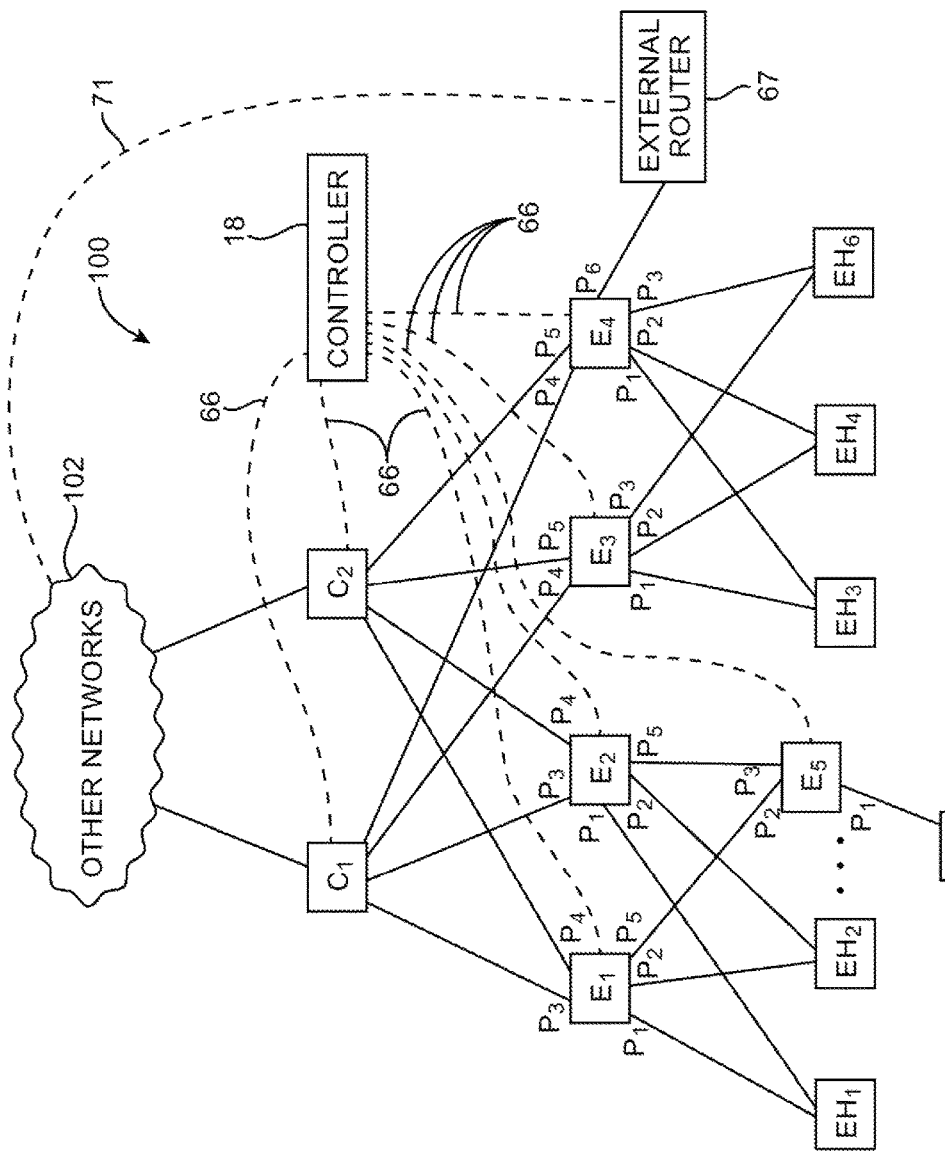
FIG. 6 is a diagram of an illustrative network having switches that may be controlled by a controller for routing network packets between end hosts in the network in accordance with an embodiment of the present invention.

FIG. 6 is a diagram of an illustrative network 100 in which switches may be controlled by a controller 18. Controller 18 may be a controller server or a distributed controller implemented across multiple computing devices. As shown in FIG. 6, network 100 may include switches C1, C2, E1, E2, E3, E4, and E5. Controller 18 may be coupled to the switches of network 100 via control paths 66. Controller 18 may control the switches using control paths 66 (e.g., by providing flow table entries such as flow table entries 68 of FIG. 3).

Network 100 may include end hosts such as end hosts EH1, EH2, EH3, EH4, EH5, and EH6 that are coupled to the switches of network 100. Switches that are directly coupled to end hosts may sometimes be referred to as edge switches, whereas switches that merely interconnect other switches and are not directly coupled to the end hosts may be referred to as core switches. In the example of FIG. 6, switches E1, E2, E3, E4, and E5 are edge switches, because they are coupled to end hosts. Switches C1 and C2 are core switches, because switches C1 and C2 interconnect switches E1, E2, E3, E4, and E5 and are not directly coupled to end hosts. Core switches such as switches C1 and C2 may couple network 100 to other networks 102 (e.g., other networks including switches and end hosts). The example of FIG. 6 in which edge switches are directly coupled to core switches are merely illustrative. If desired, additional switches may be interposed between the edge and core switches.

Devices for routing data to external networks such as internet router 67 may be coupled to the switches of network 100. In the example of FIG. 6, internet router 67 is coupled to port P6 of edge switch E4. If desired, router 67 may be coupled to additional switches in network 100 (e.g., one or more edge switches, etc.). External router 67 may be used to perform forwarding over layer 3 of the OSI model on data received from the switches in network 100 to external networks 102 (e.g., the internet) as shown by path 71. Switches in the network may be controlled using controller 18 over paths 16 whereas end hosts EH and external routers such as internet router 67 are not controlled by controller 18.

Figure 7:
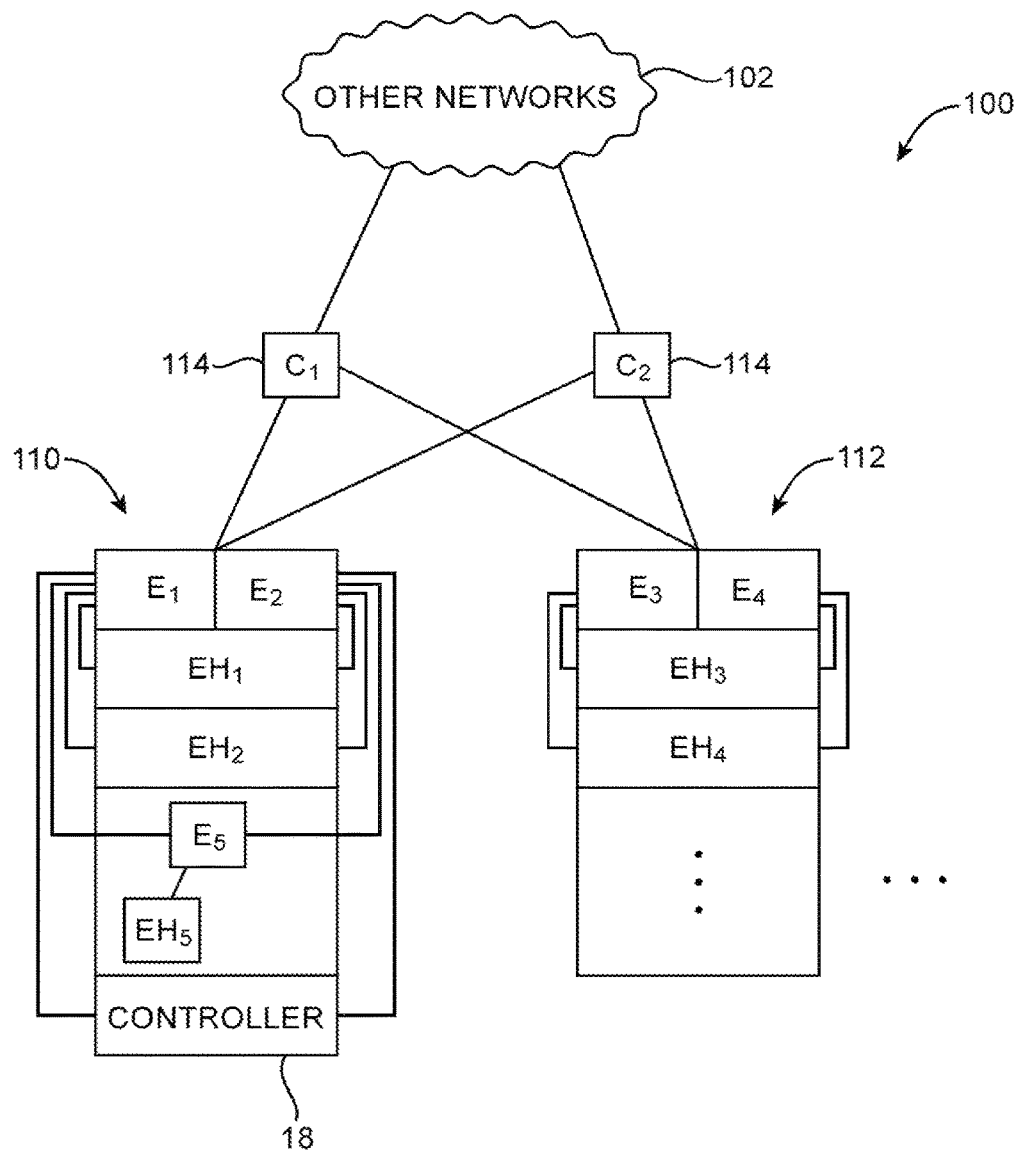
FIG. 7 is a diagram of an illustrative rack-based system that implements a network having switches that may be controlled by a controller for routing network packets between end hosts in the network in accordance with an embodiment of the present invention.

FIG. 7 is an illustrative example of network 100 of FIG. 6 that is implemented using rack-based systems. As shown in FIG. 7, edge switches and end hosts may be implemented using network racks 110 and 112 that are coupled to switches 114 (e.g., core switches as shown in FIG. 7). If desired, network 100 may include additional network racks that house additional end hosts and switches and are coupled to switches 114. Network rack 110 may include edge switches E1 and E2 and end hosts EH1 and EH2, whereas network rack 112 may include edge switches E3 and E4 and end hosts EH3 and EH4. Edge switches E1, E2, E3, and E4 may serve as top-of-rack switches that are coupled via network paths to each end host of the corresponding network rack 112. For example, top-of-rack switch E3 is connected to each of the end hosts of network 112 (e.g., end hosts EH3 and EH4).

Each top-of-rack switch serves as an interface between end hosts of the corresponding network rack and other network devices such as other portions of network 100 or other networks 102. Network traffic to or from end hosts of network rack 110 may be required to traverse at least one of the top-of-rack switches of network rack 110 (e.g., top-of-rack switches E1 and E2). Similarly, network traffic of network rack 112 may be required to traverse at least one of switches E3 and E4. As an example, network packets sent by end host EH1 to end host EH3 may be forwarded by top-of-rack switch E1, core switch C1, and top-of-rack switch E3. As another example, network packets sent by end host EH1 to end host EH3 may be forwarded by top-of-rack switch E2, core switch C1, and top-of-rack switch E4.

If desired, switches may be implemented using computing equipment of network racks 110 and 112. Switch E5 may be implemented using computing equipment such as a line card of network rack 110. Software switch E5 may sometimes be referred to as a hypervisor switch. Hypervisor switches may be implemented using dedicated circuitry or using software on discrete computing equipment (e.g., on a line card). However, such software switches are coupled to the rest of the network by cables plugged into dedicated physical ports of the computing equipment on which the software switch is implemented.

Switch E5 may interface with end hosts such as end host EH5 that are implemented on the same computing equipment as switch E5. In other words, shared computing equipment may be used to implement switch E5 and end host. If desired, multiple end hosts may be implemented in software on the shared computing equipment. For example, tens, hundreds, thousands, or more end hosts may be implemented on the shared computing equipment and logically coupled in software to logical ports of software switch E5, whereas software switch E5 is connected to network 100 by physical ports of the computing equipment on which software switch E5 is implemented.

As shown in FIG. 7, controller 18 may be implemented in network rack 110 (e.g., using the resources of a line card or other computing equipment of network rack 110). Controller 18 may communicate with the top-of-rack switches and core switches by sending control packets and receiving control plane packets from the switches. In this scenario, one or more switches of network 100 may form portions of control paths 66 of FIG. 6. For example, switch E1 or switch E2 may serve as part of control paths between core switches C1 and C2 and controller 18. As another example, switches E1, E2, C1, and C2 may form portions of control paths between controller 18 and switches E3 and E4.

Edge switches such as E1, E2, E3, and E4 that are coupled to one or more end hosts are sometimes referred to as leaf switches. For example, top-of-rack switches in a rack-based system are sometimes referred to as leaf switches. Switches 114 that are coupled to each of the leaf switches are sometimes referred to as spine switches. Spine switches may be core switches that are not connected to any end hosts (e.g., as shown in FIG. 7) or may have one or more ports that are connected to end hosts.

Figure 8:
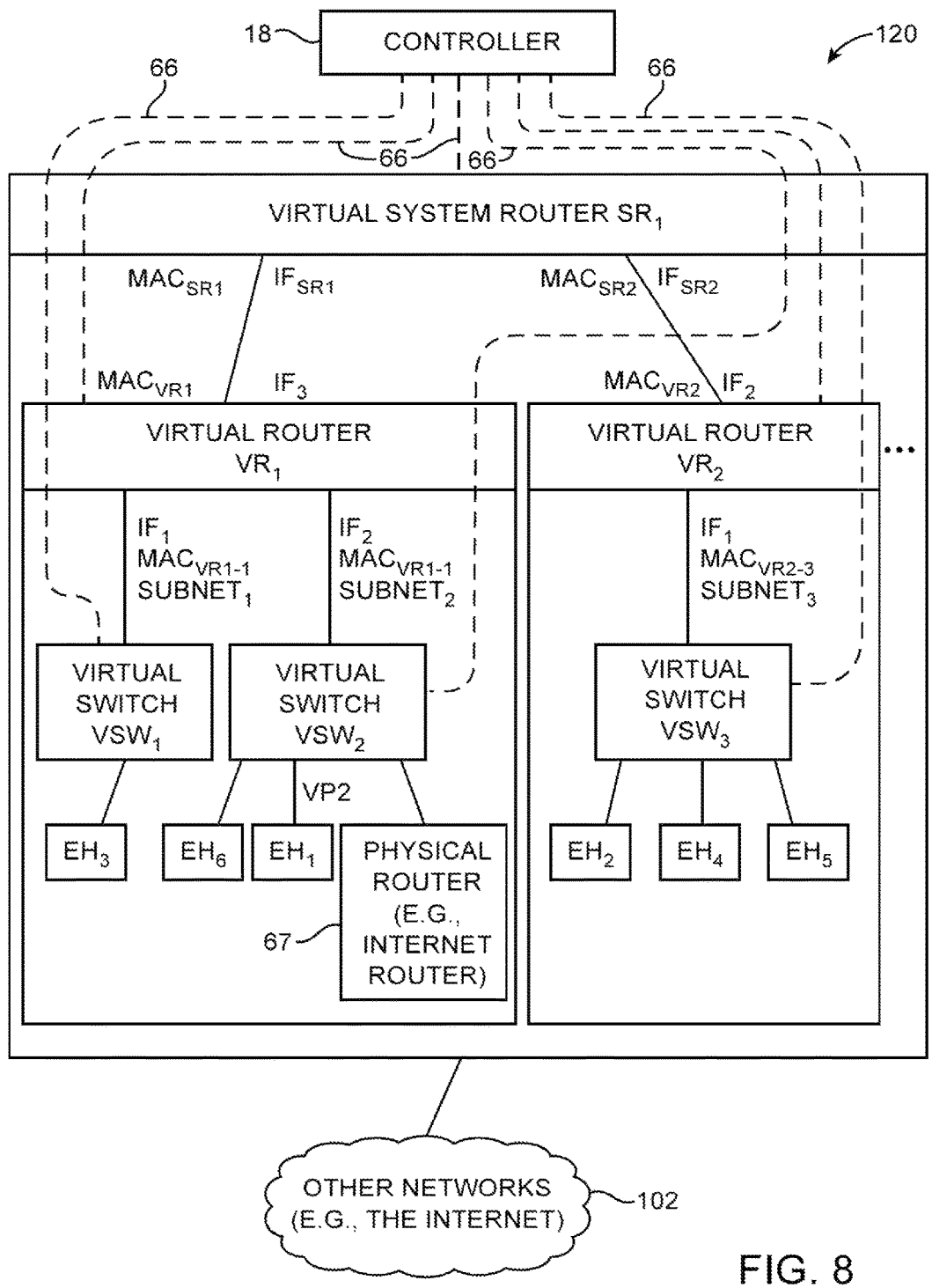
FIG. 8 is a diagram of an illustrative virtual network that may be generated by a controller from the network of FIG. 6 in accordance with an embodiment of the present invention.

It can be challenging for a user such as network administrator to configure network 100 for desired operations. For example, it can be desirable to isolate or otherwise limit communications between groups of end hosts. As another example, it can be inefficient for a network administrator to manually configure network policy or routing rules for each switch and each end host of the network. Controller 18 may be configured to implement a logical network topology of virtual routers and virtual switches over the underlying physical network topology. The logical network topology may provide benefits such as improved network configuration efficiency, flexibility, and capabilities. FIG. 8 is an illustrative example in which controller 18 is configured to implement a virtual network 120 from the underlying network 100 of FIGS. 6 and 7.

The virtual network topology of virtual network 120 may be any desired topology within the physical constraints of underlying network 100 (e.g., each virtual path has at least one if not more corresponding paths in the underlying network). The underlying network may include physical switches and/or software-based switches such as hypervisor switch E5.

As shown in FIG. 8, virtual network topology 120 (sometimes referred to herein as a logical switching fabric, logical fabric, virtual switching fabric, virtual fabric, logical system, virtual system, logical network, or virtual network) may include virtual switches such as virtual switches VSW1, VSW2, and VSW3, virtual routers such as virtual routers VR1 and VR2, and virtual system routers such as virtual system router SR1. Virtual switches may sometimes be referred to herein as logical switches, logical segments, virtual segments, or segments. Virtual routers may sometimes be referred to herein as logical routers, logical tenants, virtual tenants, or tenants. Virtual system routers may sometimes be referred to herein as logical system routers, logical system tenants, virtual system tenants, or system tenants.

Virtual switches are formed from groups of end hosts of the network and may be defined by any desired network attributes of the end hosts (e.g., by MAC addresses or ranges of MAC address of the end hosts, by IP addresses or ranges of IP addresses of the end hosts, etc.). In the example of FIG. 8, virtual switch VSW1 may be assigned end host EH3, virtual switch VSW2 may be assigned end hosts EH1 and EH6, and virtual switch VSW3 may be assigned end hosts EH2, EH4, and EH5. Controller 18 may generate the virtual switches from groups of end hosts.

In some scenarios, a physical router for routing packets to external networks such as internet router 67 may be logically indistinguishable from an end host from the perspective of the virtual routers, virtual switches, and virtual system routers (e.g., from the perspective of the logical switching fabric). For example, internet router 67 may be identified by MAC address or IP address that falls within a range of MAC address or a range of IP addresses that are used to generate (identify) the virtual switches (e.g., such that virtual switch VSW2 in fabric 120 handles traffic to and from physical router 67 as if it were an end host even though router 67 may perform additional forwarding operations with external networks 102 such as the internet). In general, the virtual switches may be formed from groups of end hosts of the network and physical routers for interfacing with external networks such as internet router (sometimes referred to herein as external routers because they route data to and from external networks that are not a part of virtual switch fabric 120). Internet router 67 may therefore sometimes be referred to herein as an end host of logical network topology 120.

In some scenarios, a network device may be assigned to multiple virtual switches. For example, physical router 67 may be assigned to both virtual switches VSW1 and VSW2 (e.g., in scenarios where physical router 67 has multiple network interfaces). In this scenario, logical fabric 120 may not be able to differentiate between a single physical router 67 connected to both virtual switches and two separate physical routers each connected to a corresponding virtual switch (e.g., because logical fabric 120 handles traffic to and from the physical router based only on the interface(s) between the physical router and the virtual switches).

Each virtual switch may be implemented as a distributed logical switch across one or more underlying switches (e.g., underlying physical or hypervisor switches). For example, virtual switches may include end hosts that are attached to different physical switches. In this scenario, the controller may control multiple physical switches in controlling a single virtual switch. Control of different virtual switches may involve controlling two sets of potentially overlapping sets of underlying physical and/or hypervisor switches (e.g., a physical switch may be controlled in performing operations associated with different virtual switches).

Examples of network attributes that may be used in characterizing an end host include the physical or hypervisor switch port to which the end host is coupled, a hardware address of the end host (e.g., a MAC address), a protocol address of the end host (e.g., an IP address), a virtual local area network (VLAN) tag, and/or other network attributes of the end host. For example, controller 18 may identify end host EH1 as attached to port P1 of switch E1, may identify end hosts EH2 and EH3 by MAC address, and may identify end host EH4 as attached for port P2 of switch E3. As another example, end host EH5 may be identified as attached to logical port P1 of hypervisor switch E5. This example is merely illustrative. Any desired network attribute such as used in network packet header fields or any desired combination of network attributes may be used in forming virtual switches.

Virtual switches may be grouped to form virtual routers (e.g., using controller 18). In the example of FIG. 8, virtual switches VSW1, and VSW2 are grouped to form virtual router VR1, whereas virtual switch VSW3 is assigned to virtual router VR2. In other words, the groups of end hosts (and external routers such as internet router 67) of virtual switches VSW1 and VSW2 are assigned to virtual router VR1, whereas the group of end hosts of virtual switch VSW3 is assigned to virtual router VR2. Each virtual switch is connected to the corresponding virtual router via a virtual router interface. Virtual switches VSW1 and VSW2 are connected to respective virtual router interfaces IF1 and IF2 of virtual router VR1, whereas virtual switch VSW3 is connected to virtual router interface IF1 of virtual router VR2.

In one example that is sometimes described herein as an example, controller 18 may identify end hosts EH by corresponding IP addresses and may group the end hosts (and internet routers such as router 67) into ranges of IP addresses sometimes referred to herein as subnets or IP subnets. If desired, each virtual router interface (and each virtual switch connected to that interface) may be assigned to a corresponding range of IP addresses (e.g., may be assigned to a corresponding subnet). In the example of FIG. 8, interface IF1 of virtual router VR1 and virtual switch VSW1 may be assigned to a first subnet SUBNET1 (e.g., using controller 18) that includes a first range of IP addresses (e.g., a range of IP addresses that includes the IP address of end host EH3), interface IF2 of virtual router VR1 and virtual switch VSW2 may be assigned to a second subnet SUBNET2 that includes a second range of IP addresses (e.g., a range of IP addresses that includes the IP addresses of end hosts EH6, EH1, and physical router 67), and interface IF1 of virtual router VR2 and virtual switch VSW3 may be assigned to a third subnet SUBNET3 that includes a third range of IP addresses (e.g., a range of IP addresses that includes the IP addresses of end hosts EH2, EH4, and EH5).

By assigning each virtual switch (virtual router interface) to a corresponding subnet, each virtual switch may serve to implement a respective broadcast domain in which broadcast network packets are forwarded to all end hosts of the virtual switch. The broadcast network packets may be network packets having header fields identifying the network packets as broadcast network packets that are destined for all end hosts of an associated broadcast domain. For example, broadcast network packets received by virtual switch VSW3 from end host EH2 may be forwarded by virtual switch VSW3 to each other end host that is assigned to virtual switch VSW3 (i.e., to end host EH4 and end host EH5).

Virtual routers perform network routing functions and provide isolation for the different broadcast domains of the virtual switches. For example, virtual router VR1 may prevent broadcast packets from being forwarded by virtual switch VSW1 to virtual switch VSW2 (and vice versa). The broadcast domains may be defined in terms of the corresponding subnets (e.g., IP address ranges) of a given virtual router interface. In contrast to virtual routers, virtual switches do not perform any network routing functions based on IP domains (e.g., virtual switches may perform network routing functions based on MAC address domains if desired).

Network routing functions that may be performed by a virtual router include modifying headers of network packets received at interfaces of the virtual router. The virtual router may decrement a time-to-live (TTL) IP header field of the network packet. The virtual router may modify Ethernet headers such as source and destination MAC address fields to correspond with a desired broadcast domain. For example, each interface of the virtual router may be assigned a respective Ethernet address. In the example of FIG. 8, interface IF1 of virtual router VR1 is assigned Ethernet address MACVR1-1 whereas interface IF2 is assigned Ethernet address MACVR1-2 and interface IF1 of virtual router VR2 is assigned Ethernet address MACVR2-3. In this scenario, the virtual router may rewrite the source MAC address fields to match the egress (outgoing) interface of the virtual router. The virtual router may rewrite the destination MAC address field to match a next-hop address (e.g., an Ethernet address of system router SR1).

Each virtual router may be implemented as a distributed logical router across one or more underlying switches (e.g., underlying physical or hypervisor switches). In this scenario, the controller may control multiple physical switches in controlling a single virtual router. Control of different virtual routers may involve controlling two potentially overlapping sets of underlying physical and/or hypervisor switches (e.g., a physical switch may be controlled in performing operations associated with different virtual routers). If desired, one or more virtual routers may be formed on the same physical/hypervisor switches or overlapping sets of physical/hypervisor switches in the network. One or more virtual routers may be formed on one or more of the same physical/hypervisor switches as the virtual switches in logical network 120.

Virtual routers may be grouped to form virtual system routers. In the example of FIG. 8, virtual routers VR1 and VR2 are grouped to form virtual system router SR1. In other words, the groups of virtual routers (and the associated groups of virtual switches and end hosts) are assigned to virtual system router SR1 (e.g., using controller 18). Each virtual router is connected to virtual system router SR1 via a respective virtual system router interface. Virtual routers VR1 and VR2 are connected to respective virtual system router interfaces IFSR1 and IFSR2 of virtual system router SR1 (e.g., a third interface IF3 of virtual router VR1 may be connected to virtual system router interface IFSR1 whereas a second interface IF2 of virtual router VR2 may be connected to virtual system router interface IFSR2). Virtual system routers may only be connected to virtual routers in system 120 (e.g., without being connected to end hosts, virtual switches, or external routers such as router 67). The example in which system router SR1 identifies virtual routers VR1 and VR2 by the associated Ethernet address is merely illustrative and, if desired, system router SR1 may identify virtual routers VR1 and VR2 using any desired data encapsulation scheme (e.g., any desired scheme other than IP address).

Network routing functions that may be performed by a virtual system router include modifying headers of network packets received at interfaces of the virtual system router. The virtual system router may decrement a time-to-live (TTL) IP header field of the network packet. The virtual system router may modify Ethernet headers such as source and destination MAC address. For example, each interface of the virtual system router (and each coupled interface of the virtual routers) may be assigned a respective Ethernet address. In the example of FIG. 8, interface IFSR1 of virtual system router SR1 is assigned Ethernet address MACSR1 whereas interface IFSR2 is assigned Ethernet address MACSR2. Interface IF3 of virtual router VR1 is assigned Ethernet address MACVR1, whereas interface IF2 of virtual router VR2 is assigned Ethernet address MACVR2. In this scenario, the virtual system router may rewrite the source MAC address fields to match the egress (outgoing) interface of the virtual system router. The virtual system router may rewrite the destination MAC address field to match a next-hop address (e.g., a next-hop address of a given virtual router).

Virtual system router SR1 may route data between virtual routers VR1 and VR2. If desired, controller 18 may control virtual system router SR1 to apply inter-virtual router network policies for routing packets between the virtual routers (e.g., by providing virtual system router SR1 with corresponding flow table entries). By coupling multiple virtual routers to a single virtual system router, data may be more efficiently routed between two virtual routers by routing the data through the virtual system router relative to scenarios where multiple virtual routers are connected in other manners (e.g., in a chain or star configuration). Controller 18 may be used to define the virtual switches, virtual routers, and virtual system routers in system 120 (e.g., by assigning end hosts to desired groups and implementing forwarding policies on the underlying physical switches). Controller 18 may actively control the operation of the virtual routers, virtual switches, and virtual by independently providing each of the virtual switches, virtual routers, and virtual system routers with corresponding network forwarding rules that implement desired network policies.

Each virtual system router may be implemented as a distributed logical router across one or more underlying switches (e.g., underlying physical or hypervisor switches). In this scenario, the controller may control multiple physical switches in controlling a single virtual system router. Control of different virtual system routers may involve controlling two potentially overlapping sets of underlying physical and/or hypervisor switches (e.g., a physical switch may be controlled in performing operations associated with different virtual system routers). If desired, one or more virtual system routers may be formed on the same physical/hypervisor switches or overlapping sets of physical/hypervisor switches in the network (e.g., the virtual routers, virtual system routers, and virtual switches may all be implemented on a single hypervisor switch or on any desired combination of one or more physical and/or hypervisor switches). The example of FIG. 8 is merely illustrative. If desired, fabric 120 may include any desired number of virtual system routers, virtual routers, virtual switches, and controllers 18 arranged in any desired manner.

Figure 9:
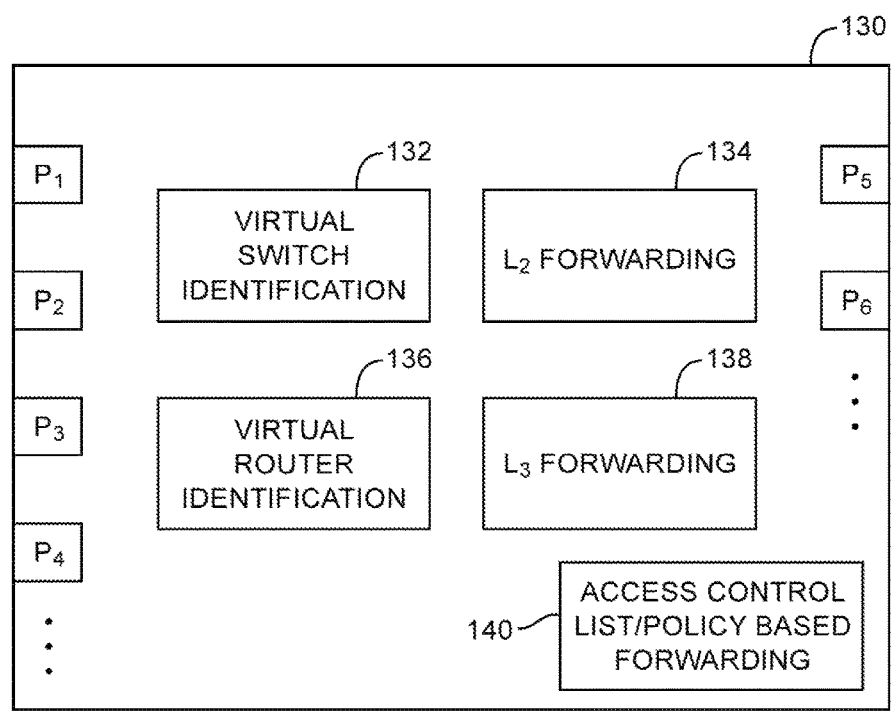
FIG. 9 is a diagram of an illustrative switch having modules that each performs a subset of packet forwarding operations in accordance with an embodiment of the present invention.

FIG. 9 is an illustrative block diagram of a switch 130 such as a physical or hypervisor switch. Switch 130 may, for example, be an edge switch such as edge switch E1, E2, E3, or E4 of FIG. 6 (e.g., a leaf switch as shown in FIG. 7) or may be a core switch such as switches C1 or C2 (e.g., a spine switch as shown in FIG. 7). As shown in FIG. 9, switch 130 may include ports such as ports P1, P2, P3, P4, P5, P6, etc. Switch 130 may include virtual switch identification module 132, L2 forwarding module 134, virtual router identification module 136, L3 forwarding module 138, and access control list and policy based forwarding module 140. The modules may be implemented using respective dedicated circuitry, may be implemented using shared dedicated circuitry, or may be implemented using software on processing circuitry. For example, these modules may be implemented using packet processing software 26 of FIG. 1 and/or packet processing circuitry 32 and may perform functions based on flow table entries provided by a controller.

A network packet received at one of the switch ports may be processed by one or more of the modules in determining how to forward the network packet. The modules may process the network packet in any desired sequence or in parallel. The operations performed by each module may be controlled by a controller.

Virtual switch identification module 132 may determine which virtual switch the network packet is assigned to based on network attributes associated with the network packet (e.g., incoming port, source address information such as Ethernet or IP source address, etc.). Module 132 may provide information identifying the virtual switch to L2 forwarding module 134. L2 forwarding module 134 may perform network forwarding based on the virtual switch information provided by module 132 (e.g., forwarding decisions at layer 2 of the Open Systems Interconnection "OSI" model). For example, L2 forwarding module 134 may determine which switch port the network packet should be forwarded to based on the virtual switch information and additional packet information such as a destination MAC address retrieved from the network packet.

In scenarios such as when destination end host is associated with a different virtual switch than the source end host, virtual router identification module 136 and L3 forwarding module 138 may be used. For example, network packets received by switch E3 from end host EH3 that are destined for end host EH1 may be processed using L3 forwarding module 138, because end host EH3 is assigned to virtual switch VSW1, whereas end host EH1 is assigned to virtual switch VSW2. In other words, the IP domain of interface IF1 that is associated with end host EH3 is different from the IP domain of interface IF2 that is associated with end host EH1. In these scenarios, network routing at the IP layer (e.g., level 3 of the OSI model) may be required.

Virtual router identification module 136 may identify which virtual router should be used in controlling the network packet. Module 136 may use network attributes of the network packet along with information received from other modules of the switch. For example, module 136 may use identified virtual switch information received from L2 forwarding module 134 along with IP address information retrieved from the network packet in determining which virtual router controls the network packet.

Virtual router identification module 136 may provide identified virtual router information to L3 forwarding module 138. L3 forwarding module 138 may perform network routing operations based on the identified virtual router information and based on additional information retrieved from the network packet. As an example, L3 forwarding module 138 may use IP header fields such as destination address fields to determine which port of the switch should be used in forwarding the network packet. In performing network routing operations, L3 forwarding module 138 may modify the network packet. For example, module 138 may decrement a TTL header field and may rewrite layer 2 header fields such as source and destination MAC addresses.

Consider the scenario in which a network packet received at switch E2 from end host EH1 is destined for end host EH3. In this scenario, the network packet may include the MAC address of end host EH1 as a source MAC address, the MAC address of virtual router VR1 as the destination MAC address (because end host EH1 is coupled to a different L3 interface of virtual router VR1 than end host EH3 and does not have access to the MAC address of end host EH3), the IP address of end host EH1 as a source IP address, and the IP address of end host EH3 as a destination IP address. Virtual router identification module 136 may determine that the source end host (EH1) is coupled to interface IF2 of virtual router VR1 via virtual switch VSW2 (e.g., based on flow table entries provided by a controller). L3 forwarding module 138 may determine that destination end host EH3 is coupled to interface IF1 of virtual router VR1 and perform network routing operations in routing the network packet to end host EH3 via interface IF1 of virtual router VR1 (e.g., based on flow table entries provided by a controller). The network routing operations may include decrementing a TTL field of the network packet and rewriting the source and destination MAC addresses of the packet. In particular, the source MAC address may be rewritten from the MAC address of end host EH1 to the MAC address of interface IF1 of virtual router VR1, whereas the destination MAC address may be rewritten from the MAC address of interface IF2 of virtual router VR1 to the MAC address of end host EH3.

Access control list and policy based forwarding module 140 may process the network packets after the packets have been processed by L2 forwarding module 134 and/or L3 forwarding module 138 (e.g., packets may be passed to module 140 prior to passing the packets to an egress port on switch 130). Module 140 may serve as an override to forwarding modules 134 and 138 in determining which port to route the data packets to. Module 140 may perform network routing and network access control operations based on network policy rules identified by controller 18 and information retrieved from the network packet.

If desired, switch 130 may include a virtual system router identification module (not shown) that identifies which virtual system router should be used in controlling the network packet. The virtual system router identification module may identify which virtual system router should be used in controlling the network packet and may use network attributes of the network packet along with information received from other modules of the switch. The virtual system router identification module may provide virtual system router information to L2 forwarding module 134, L3 forwarding module 138, and/or access control module 140. Modules 134, 138, and 140 may perform network routing operations based on the identified virtual system router information and based on information retrieved from the network packet.

Controller 18 may be used to apply and enforce network policy rules at logical ports of the virtual network (e.g., virtual ports of distributed virtual switches or interfaces of distributed virtual routers). Network policy rules may include network routing rules (sometimes referred to herein as policy-based routing (PBR) rules) that help determine network paths between end hosts and may include access control lists that allow or block selected network traffic. If desired, controller 18 may receive combined access control list and network routing rules from a user as the network policy rules (e.g., the user may specify an access control list and network routing rules simultaneously to controller 18). The access control list and network routing rules may be provided to controller 18 by a user. Controller 18 may provide forwarding rules implementing the access control list policy rules and network routing rules (e.g., as flow table entries) for implementation on module 140 of switches 130.

Figure 10:
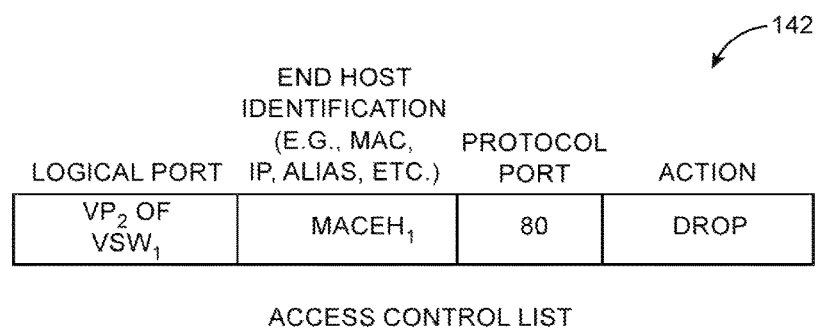
FIG. 10 is an illustrative entry in an access control list that may be implemented by a controller in accordance with an embodiment of the present invention.

FIG. 10 is a diagram of an illustrative access control list that may be provided by a user and implemented by controller 18. As shown in FIG. 10, access control list 142 identifies network attributes such as logical port, end host information, and protocol port. In general, any desired network attribute such as one or more logical ports, logical interfaces, physical ports and/or packet header fields may be included in access control list 142. The packet header fields may include header fields that identify one or more end hosts (e.g., a source or a destination end host). For example, access control list 142 may include end host identification fields such as source MAC address, source IP address, destination MAC address, and/or destination IP address.

Controller 18 may generate flow table entries that implement the network policy rule defined by access control list 142. In the example of FIG. 8, access control list 142 identifies logical port VP2 of virtual port VSW1, the MAC address of end host EH1 (MACEH1), and protocol port 80. Protocol port 80 may be a Transmission Control Protocol (TCP) port. Controller 18 may process access control list 142 to determine that network packets received at logical port VP2 of virtual switch VSW1 having source MAC address MACEH1 and TCP protocol port 80 should be dropped (i.e., packets matching the network attributes identified in control list 142 should be dropped). Use of logical ports such as VP2 of virtual switch VSW1 may provide flexibility to a network administrator in configuring the network, as virtual network topology 120 may have any desired arrangement of virtual switches and assignment of end hosts to the virtual switches. If desired, access control list 142 may be combined with a policy based routing entry that is provided by a user (e.g., an entry similar to access control list 142 but with an action field to forward the packet to a desired destination instead of the action field "DROP"). Controller 18 may subsequently generate and provide flow table entries to the underlying physical and/or hypervisor switches of underlying network 100 that implement access control list 132 (e.g., may provide the flow table entries to switch 130 for implementation on module 140 as shown in FIG. 9).

Figure 11:
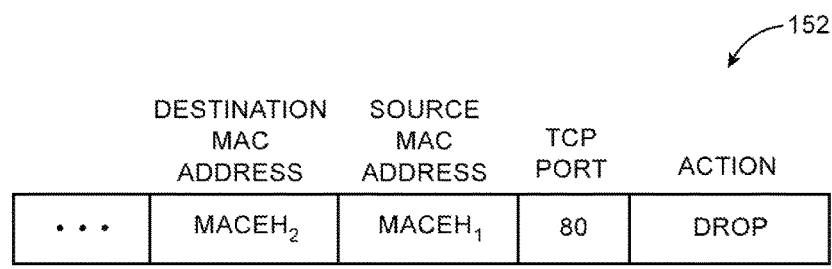
FIG. 11 is an illustrative flow table entry that may be generated by a controller in implementing a network policy rule such as a policy rule identified by an access control list in accordance with an embodiment of the present invention.

FIG. 11 is an illustrative flow table entry that controller 18 may generate in implementing access control list 142. As shown in FIG. 11, flow table entry 152 may include the MAC address of end host EH1 in a source MAC address field, the MAC address of end host EH2 in a destination MAC address field, and port 80 in a TCP port field. Flow table entry 152 may include additional matching fields that are wildcarded (not shown) so that flow table entry 142 matches all packets having source MAC address MACEH1, destination MAC address MACEH2, and TCP port 80. Flow table entry 152 may be provided to one or more physical or hypervisor switches in implementing access control list 142 (e.g., for implementation on module 140 of switch 130 as shown in FIG. 9). In scenarios where access control list 142 is combined with a policy based routing entry that is provided by a user, flow table entries having an action field for forwarding the data packet to a desired destination may be generated.

Flow table entries implemented on module 140 of switch 130 may process data packets after the packets have been processed by L2 forwarding module 134 and/or L3 forwarding module 138. Module 140 may override the forwarding determinations made at modules 134 and 138. For example, if a packet that is determined in module 138 to be forwarded to port P6 matches an entry in module 140 to drop that packet (e.g., in scenarios where the data packet is generated by an end host that has restricted access to the network), module 140 may override the previous determination of module 138 to forward the packet to port P6 and may drop the packet. In another example, if the packet matches an entry in module 140 to route the packet to a desired destination (e.g., based on policy based routing rules implemented on controller 18), module 140 may override the previous determination to forward the packet to port P6 and may subsequently forward the packet to the desired destination (e.g., over an appropriate port).

If desired, a user may specify an access control list and policy based routing rules for each virtual switch, virtual router, and/or virtual system router on fabric 120 independently. For example, a user may specify a first set of access control rules and policy based routing rules for the virtual switches on fabric 120, may specify a second set of access control rules and policy based routing rules for the virtual routers on fabric 120, and may specify a third set of access control rules and policy based routing rules for the virtual system routers on fabric 120. By independently providing access control and routing rules for each the virtual switches, virtual routers, and virtual system routers, a network administrator may operate fabric 120 with improved flexibility and efficiency relative to systems in which a single set of policies is provided to all of the switches on the network.

The modules of the switch 130 may collectively implement a flow table such as flow table 28 for the switch. For example, flow table entries operating only on layer 2 header fields may be implemented using virtual switch identification module 132 and L2 forwarding module 134. As another example, flow table entries operating only on layer 3 header fields may be implemented using virtual router identification module 136 and L3 forwarding module 138. As yet another example, flow table entries operating on both layer 2 and layer 3 header fields may be implemented using identification module 132, L2 forwarding module 134, virtual router identification module 136 and L3 forwarding module 138. Flow table entries implemented on module 140 may operate on any desired fields of the received packets.

The example of FIG. 9 in which modules 132, 134, 136, 138, and 140 are implemented separately is merely illustrative. If desired, the functions of any two or more modules may be merged and implemented using shared circuitry. The modules may be implemented as software modules in a software switch such as hypervisor switch E5 of FIG. 7 or may be implemented using dedicated circuitry. Each switch 130 may be capable of performing both network forwarding and network routing, which helps to allow a controller to implement distributed virtual switches, virtual routers, and virtual system routers.

Figure 12:
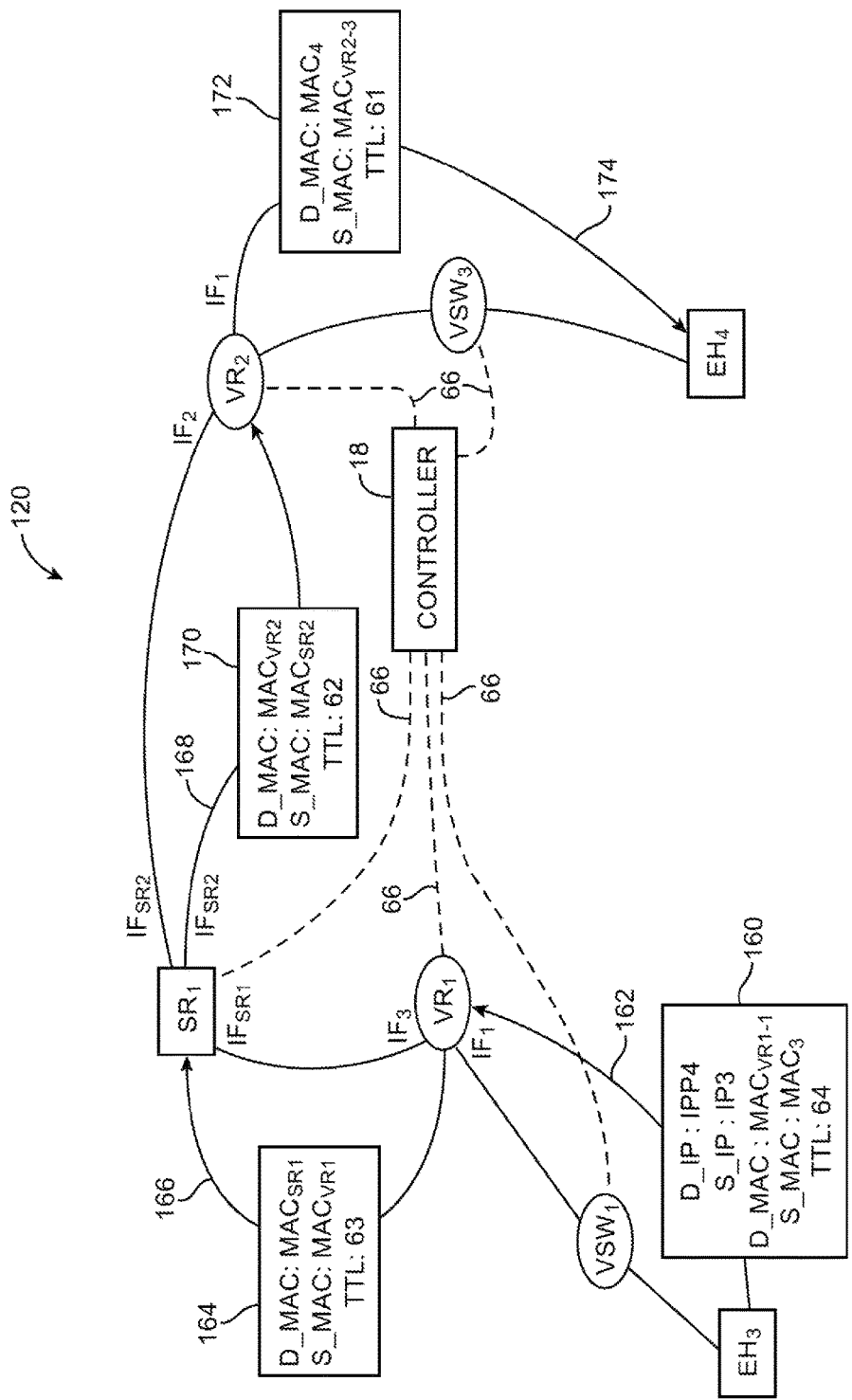
FIG. 12 is a diagram showing how a virtual network topology may include virtual switches, virtual routers and virtual system routers that are controlled by a controller to perform packet forwarding operations between a source end host and a destination end host in accordance with an embodiment of the present invention.

A controller may use virtual, distributed routers, system routers, and switches in directing network traffic through a network. FIG. 12 is a diagram illustrating how a controller may control virtual routers, virtual system routers, and virtual switches to route network traffic from a first end host to a second end host in the network. The virtual network topology of FIG. 12 corresponds with FIG. 8 and underlying network topology 100 of FIG. 6. In the example of FIG. 12, elements such as virtual switch VSW2 have been left out in order to not unnecessarily obscure the description.

In the example of FIG. 12, end host EH3 may send a network packet 160 destined for end host EH4 at step 162 (shown as an arrow). Network packet 160 may include the IP address of end host EH4 (IP4) as a destination IP address and the IP address of end host EH3 (IP3) as a source IP address. Packet 160 may include the MAC (e.g., Ethernet) address of end host EH3 as a source MAC address (MAG3) and an initial TTL value of 64 (or any desired initial value). End host EH3 is associated with and coupled to a different L3 interface than end host EH4 (e.g., end hosts EH3 and EH4 are not coupled to the same interface of a single virtual router). End host EH3 therefore does not have access to the MAC address of end host EH4 and may include the MAC address of interface IF1 of virtual router VR1 (MACVR1-1) as the destination MAC address of network packet 160.

Based on the destination MAC address field of packet 160, virtual switch VSW1 may pass network packet 160 to interface IF1 of virtual router VR1. Layer 3 header fields such as IP header fields may be ignored by the virtual switch during processing. Virtual router VR1 may receive packet 160 at interface IF1 and perform network routing operations on the packet. Based on control data from the controller, virtual router VR1 may determine that network packet 160 should be routed through system router SR1 (e.g., the controller may provide control data to virtual router VR1 that identifies that packet 160 is to be forwarded to the IP destination address of end host EH4 coupled to a different virtual router). For example, control data provided to virtual router VR1 by controller 18 may instruct virtual router VR1 to route data having a destination assigned to a different virtual router through system router SR1. Virtual router VR1 may modify packet 160 to produce and send modified network packet 164 to system router SR1 at step 166. In the example of FIG. 12, virtual router VR1 may rewrite the destination MAC address of the packet to the MAC address of system router SR1 (MACSR1), rewrite the source MAC address to the MAC address of interface IF3 of virtual router VR1 (MACVR1), and decrement the TTL header field to 63.

Virtual router VR1 may send modified packet 164 to virtual system router SR1 via interface IF3. Virtual system router SR1 may receive packet 164 at interface IFSR1 and may perform network routing operations on the received packet. Based on control data from the controller (e.g., received flow table entries), virtual system router SR1 may determine that network packet 164 should be routed through virtual router VR2 (e.g., because end host EH4 is associated with and coupled to a different virtual system router interface than end host EH3). Virtual system router SR1 may modify packet 164 to produce and send modified network packet 170 to virtual router VR2 at step 168. The source and destination IP address information in the network packet may be maintained by virtual system router SR1. Virtual system router SR1 may use the maintained destination IP address information in modified packet 164 in determining that the packet should be sent to virtual router VR2 via interface IFSR2, for example. In the example of FIG. 12, virtual system router SR1 may rewrite the destination MAC address of the packet to the MAC address of virtual router VR2 (MACVR2), rewrite the source MAC address to the MAC address of interface IFSR2 of virtual system router SR1 (MACSR2), and decrement the TTL header field to 62.

Virtual router VR2 may receive packet 170 at interface IF2 and perform network routing operations on the packet. Based on control data from the controller, virtual router VR2 may determine that network packet 170 should be routed to end host EH4 through virtual switch VSW3 Virtual router VR2 may modify packet 170 to produce and send modified network packet 172 to end host EH4 via virtual switch VSW3 (at step 174). During steps 162, 166, 168, and 174, the source and destination IP address information in the network packet may be maintained (e.g., virtual router VR1, virtual system router SR1, virtual router VR2, and virtual switches VSW1 and VSW3 do not modify the source or destination IP address information in processing the network packet). Virtual router VR2 may use the maintained destination IP address information in modified packet 170 in determining that the packet should be sent to end host EH4 via interface IF1, for example. In the example of FIG. 12, virtual router VR2 may rewrite the destination MAC address of the packet to the MAC address of end host EH4 (MAC4), rewrite the source MAC address to the MAC address of interface IF1 of virtual router VR2 (MACVR2-3), and decrement the TTL header field to 61. Based on the destination MAC address field of packet 172, virtual switch VSW3 may pass network packet 172 to end host EH4 (e.g., to MAC address MAC4). Layer 3 header fields such as IP header fields may be ignored by the virtual switch during processing.

Controller 18 may control virtual switches, virtual system routers, and virtual routers by providing flow table entries to the underlying switches (e.g., physical switches and hypervisor switches) over which the virtual switches, virtual system routers, and virtual routers are distributed. During packet forwarding operations, virtual switches, virtual routers, and virtual system routers in logical topology 120 may be indistinguishable from a physical network of physical switches and routers from the perspective of the end hosts. Virtual switches, virtual routers, and virtual system routers in logical topology 120 may be configured to perform any desired network operations (e.g., operations that are associated with the operation of a network of physical switches and routers) even though the virtual switches, virtual routers, and virtual system routers may be distributed over any desired number of underlying physical switches and/or hypervisor switches.

For example, end hosts may ping virtual routers VR (e.g., may send Internet Control Message Protocol (ICMP) echo request packets to virtual routers VR and virtual routers VR may generate and transmit ICMP response packets for the end hosts) and/or may perform packet trace route operations. If desired, end hosts EH may transmit ICMP echo request packets to the IP address of the virtual router to which that end host is assigned (e.g., end host EH3 may send request packets to the IP address of end interface IF1 of virtual router VR1) or may send echo request packets to the IP address of virtual routers to which that end host has not been assigned (e.g., end host EH3 may send request packets to the IP address of virtual router VR2). If desired, the virtual routers and/or virtual system routers in fabric 120 may inject Address Resolution Protocol (ARP) request packets into the network to resolve unknown Ethernet (MAC) addresses of end hosts in the network.

Figure 13:
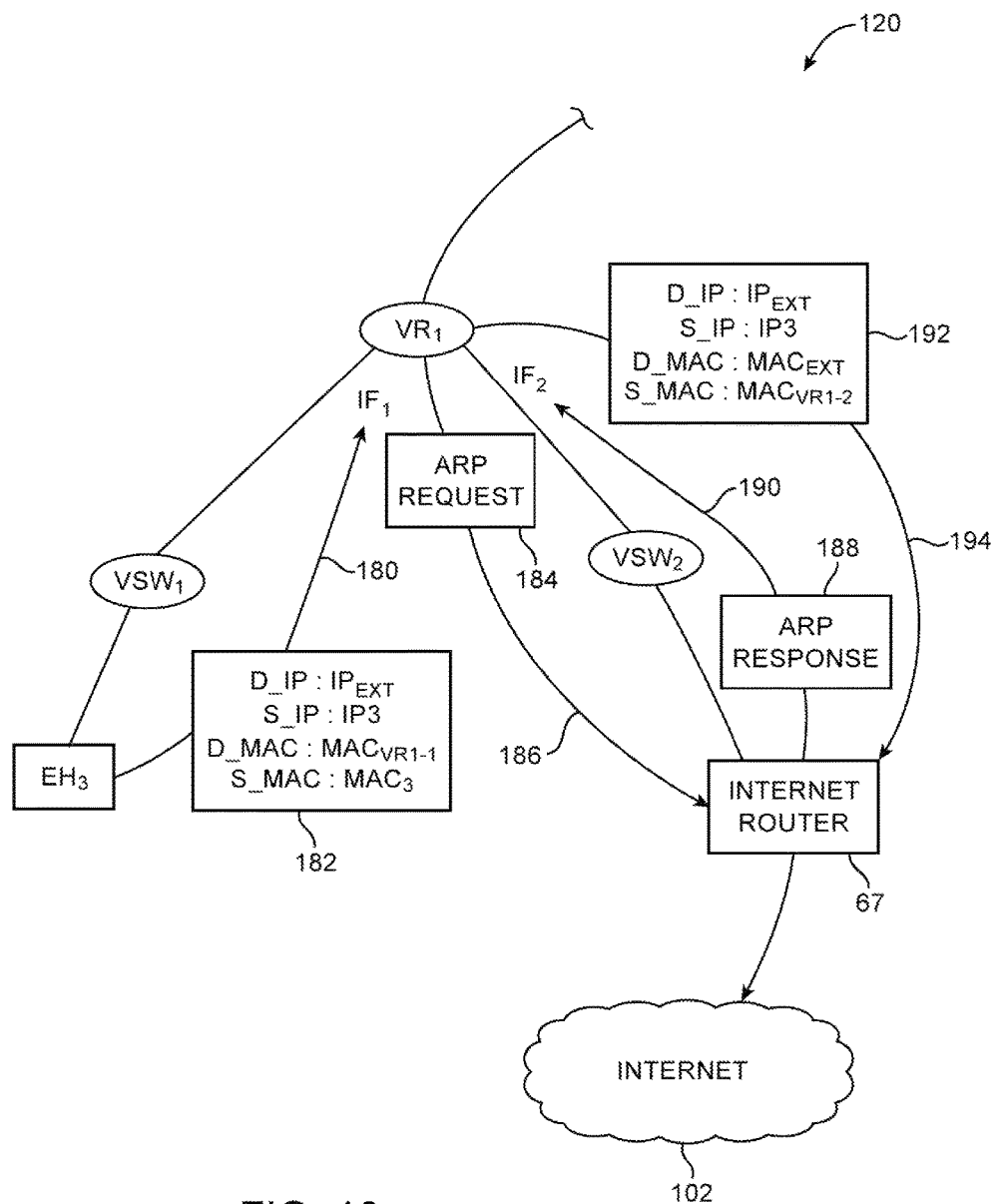
FIG. 13 is a diagram showing how a virtual network topology may be controlled by a controller to perform packet forwarding operations between a source end host and a physical router having an unknown Ethernet address in accordance with an embodiment of the present invention.

FIG. 13 is a diagram illustrating one example of how a controller may control virtual routers, virtual system routers, and virtual switches to route network traffic from a first end host to an external network through a physical router having an unresolved (unknown) Ethernet address. The virtual network topology of FIG. 13 corresponds with FIG. 8 and underlying network topology 100 of FIG. 6. In the example of FIG. 13, elements such as virtual switch VSW3, controller 18, and virtual router VR2 have been omitted in order to not unnecessarily obscure the description.

In the example of FIG. 13, end host EH3 may send a network packet 182 destined for the internet (e.g., external network 102) at step 180. In order to reach external network 102, logical fabric 120 needs to forward packet 182 to internet router 67 which interfaces with external network 120. In some scenarios, internet router 67 may have an unknown Ethernet address but a known IP address that is within a range of an IP subnet identified by controller 18 (e.g., when controller 18 generates logical fabric 120, the known IP address of physical router 67 may be assigned to subnet SUBNET2 associated with interface IF2 of virtual router VR1 even when the Ethernet address of router 67 is unresolved).

Network packet 182 may include the IP address of external router 67 (IPEXT) as a destination IP address and the IP address of end host EH3 (IP3) as a source IP address. Packet 182 may include the MAC (e.g., Ethernet) address of end host EH3 as a source MAC address (MAG3). End host EH3 is associated with and coupled to a different L3 interface than end host EH4 (e.g., end host EH3 may be assigned to interface IF1 by controller 18 whereas external router 67 may be assigned to interface IF2 of virtual router VR1). End host EH3 therefore does not have access to the MAC address of external router 67 and may include the MAC address of interface IF1 of virtual router VR1 (MACVR1-1) as the destination MAC address of network packet 160.

Based on the destination MAC address field of packet 182, virtual switch VSW1 may pass network packet 182 to interface IF1 of virtual router VR1. Layer 3 header fields such as IP header fields may be ignored by the virtual switch during processing. Virtual router VR1 may receive packet 182 via interface IF1 and perform network routing operations on the packet. Based on control data from the controller, virtual router VR1 may determine that network packet 182 should be routed through interface IF2 (e.g., because the destination IP address IPEXT of external router 67 may fall within the range of IP addresses in subnet SUBNET2 assigned to interface IF2). However, in the example of FIG. 13, virtual router VR1 may have no knowledge of the Ethernet (MAC) address of internet router 67 (e.g., because internet router 67 may have been recently added to the network, etc.).

In this scenario, virtual router VR1 may generate and broadcast an ARP request packet 184 (sometimes referred to as an ARP probe packet) to subnet SUBNET2 (e.g., to interface IF2) at step 186. External router 67 may receive the broadcast ARP probe packet 184 and may generate an ARP response packet 188 that identifies the MAC address of external router 67 (MACEXT) at step 190. Virtual router VR1 may receive response packet 188 and may process the response packet to resolve Ethernet address MACEXT of external router (e.g., as identified in the response packet). If desired, virtual router VR1 may store the Ethernet address of external router 67 in memory for future use (e.g., so that additional ARP request packets need not be broadcast by virtual router VR1 for future communications between fabric 120 and external router 67). Virtual router VR1 may modify packet 182 to produce and send modified network packet 192 to physical router 67 at step 194. In the example of FIG. 13, virtual router VR1 may rewrite the destination MAC address of the packet to the resolved MAC address of external router 67 (MACEXT) and rewrite the source MAC address to the MAC address of interface IF2 of virtual router VR1 (MACVR1-2). External router 67 may subsequently process packet 192 to forward packet 192 to the internet 102.

Figure 14:
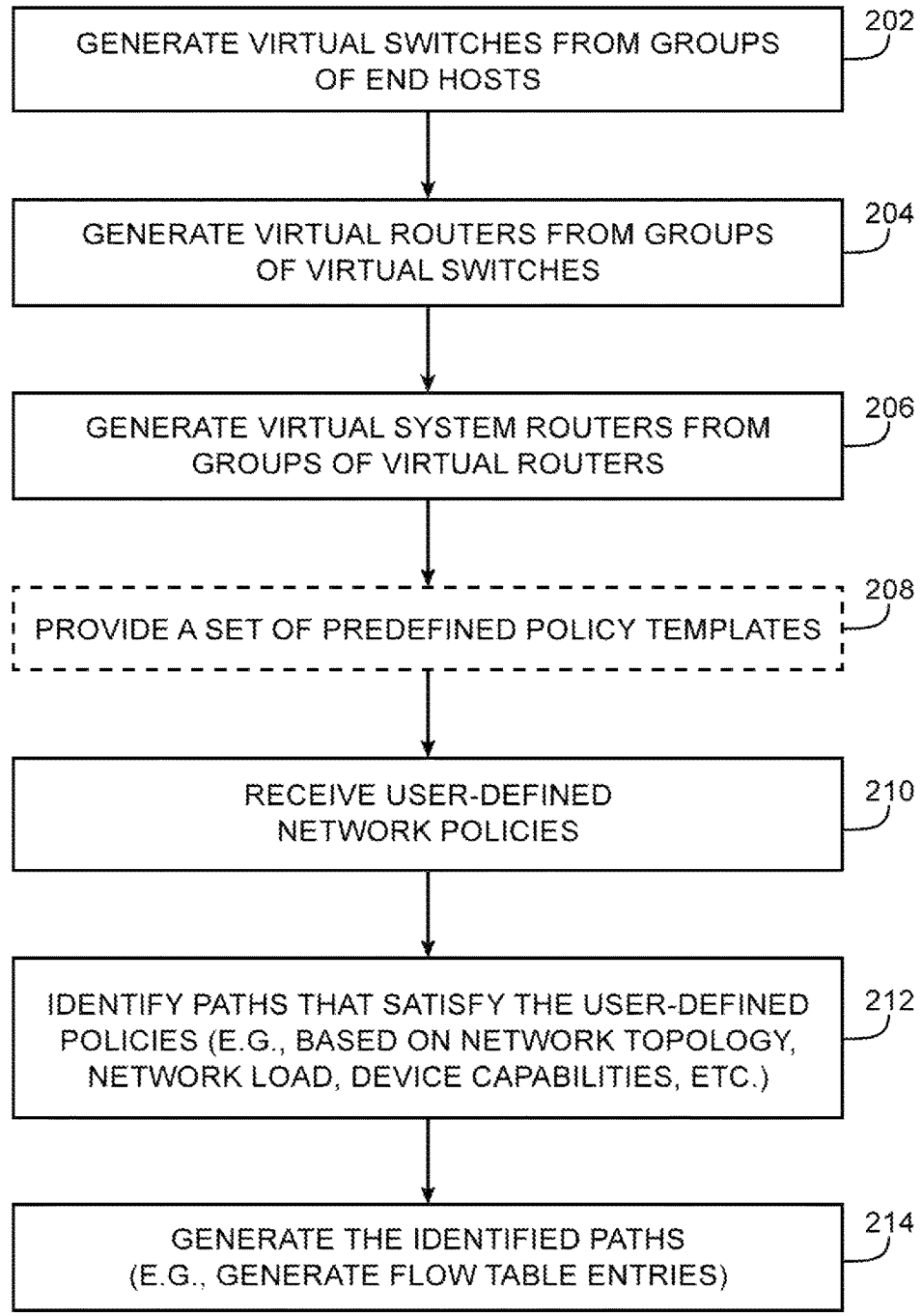
FIG. 14 is a flow chart of illustrative steps that may be performed by a controller in generating a virtual network topology having virtual routers and virtual system routers and in controlling the virtual network to implement desired network policies in accordance with an embodiment of the present invention.

FIG. 14 shows a flow chart of illustrative steps that may be performed by a controller such as controller 18 of FIG. 6 to implement a logical switching fabric such as fabric 120 of FIG. 8 based on network forwarding policies.

During step 202, the controller may generate virtual switches from groups of end hosts (e.g., groups of end hosts such as end hosts EH1 and EH2 and physical routers to external networks such as internet router 67). The virtual switches may be defined by a user such as network administrator. For example, the controller may receive information identifying groups of end hosts that should be assigned to respective virtual switches.

During step 204, the controller may generate virtual routers from groups of virtual switches. In other words, the controller may generate virtual routers from sets of groups of end hosts. The controller may generate the virtual routers based on information received from a user (e.g., similar to virtual switches). For example, the controller may receive information identifying groups of virtual switches that should be assigned to respective virtual routers.

During step 206, the controller may generate virtual system routers from groups of virtual routers. In other words, the controller may generate virtual routers from sets of groups of virtual switches (which are, for example, equivalent to sets of end hosts). For example, the controller may receive information identifying groups of virtual routers that should be assigned to respective virtual system routers. The controller may subsequently perform the operations of step 210 or, optionally, the steps of optional step 208.

In scenarios where virtual system 120 is formed over a rack-based network, controller 18 may, if desired, implement virtual system routers such as virtual system router SR1 of FIG. 8 over underlying spine switches such as switches C1 and C2 as shown in FIG. 7. In one suitable arrangement, controller 18 may implement virtual system router SR1 on a single spine switch such as spine switch C1. In another suitable arrangement, controller 18 may distribute virtual system router SR1 over multiple spine switches (e.g., so that virtual system router SR1 is only implemented over spine switches). In yet another suitable arrangement, controller 18 may implement virtual system router SR1 across one or more spine switches and one or more leaf switches. In general, controller 18 may implement virtual system router SR1 across any desired number and combination of spine switches, leaf switches, and hypervisor switches.

If desired, controller 18 may implement virtual routers such as virtual router VR1 over underlying leaf switches such as leaf switches E1 and E2 as shown in FIG. 7 (e.g., controller 18 may implement virtual system router SR1 on spine switches whereas virtual routers may be implemented on leaf switches). Controller 18 may implement virtual router VR1 on a single leaf switch, distributed across multiple leaf switches, or on one or more leaf switches and one or more spine switches. If desired, controller 18 may implement virtual routers only on leaf switches and may implement the corresponding system routers only on spine switches. In general, controller 18 may implement virtual routers across any desired number and combination of spine switches, leaf switches, and hypervisor switches.

During optional step 208, the controller may provide a set of predefined policy templates. For example, the controller may maintain a database mapping predetermined network topologies with commonly used or preferred policies (e.g., access control list policies or routing policies) for those network arrangements. Network topologies maintained in the database may include virtual network topologies or underlying physical network topologies. In this optional scenario, the user may select from the provided set of service policies during subsequent step 210.

During step 210, the controller may receive network policies for applying to associated network traffic (e.g., for implementing on flow tables of the virtual switches, virtual routers, and virtual system routers of system 120). The network policies may be received from a user such as a network administrator. Network traffic may be identified by network sources and network destinations. The policies may be identified as an ordered list or may be identified by a set of one or more requirements. For example, the policies may include combined access control list policies and policy based routing policies (e.g., policies controlling whether a network packet is permitted or dropped or routed to a desired location for implementing on module 140 of FIG. 9).

During step 212, the controller may identify paths that satisfy the user-defined policies (e.g., paths between virtual switches, virtual routers, and virtual system routers). The controller may maintain information identifying the network topology which may be used to identify the paths. For example, the controller may communicate with physical and hypervisor switches in determining the network topology that underlies the virtual network topology. The controller may identify the paths based on information maintained at the controller such as network load and device capabilities to improve performance, to satisfy policy-defined requirements, or to satisfy any desired criteria. The controller may identify the paths to packet forwarding using one or more virtual routers, one or more virtual system routers, and/or one or more virtual switches as shown in FIG. 8. In identifying the paths, the controller may first identify virtual paths in a virtual network topology maintained by the controller (e.g., paths through virtual routers, virtual system routers, and/or virtual switches as shown in FIG. 8). The controller may subsequently identify paths in the underlying network topology based on the virtual paths (e.g., paths through physical switches and hypervisor switches as shown in FIG. 6).

During step 214, the controller may generate the paths identified during step 210. The controller may communicate with physical and hypervisor switches in generating the identified paths. For example, the controller may provide flow table entries that direct the physical and hypervisor switches to forward and modify network packets matching the flow table entries along the desired network paths (e.g., the controller may provide flow table entries for implementing in module 134, 138, and/or override module 140 as shown in FIG. 9). If desired, controller 18 may independently generate flow table entries for implementing the identified paths that satisfy the user-defined policies for each of the virtual routers, virtual system routers, and virtual switches (e.g., controller 18 may generate a first independent set of flow table entries for implementation on virtual system router SR1 (e.g., on the underlying switches assigned to virtual system router SR1), a second independent set of flow table entries for implementation on virtual router VR1, a third independent set of flow table entries for implementation on virtual switch VSW1, etc.). In this way, controller 18 may flexibly control data forwarding operations across virtual topology 120.

Figure 15:
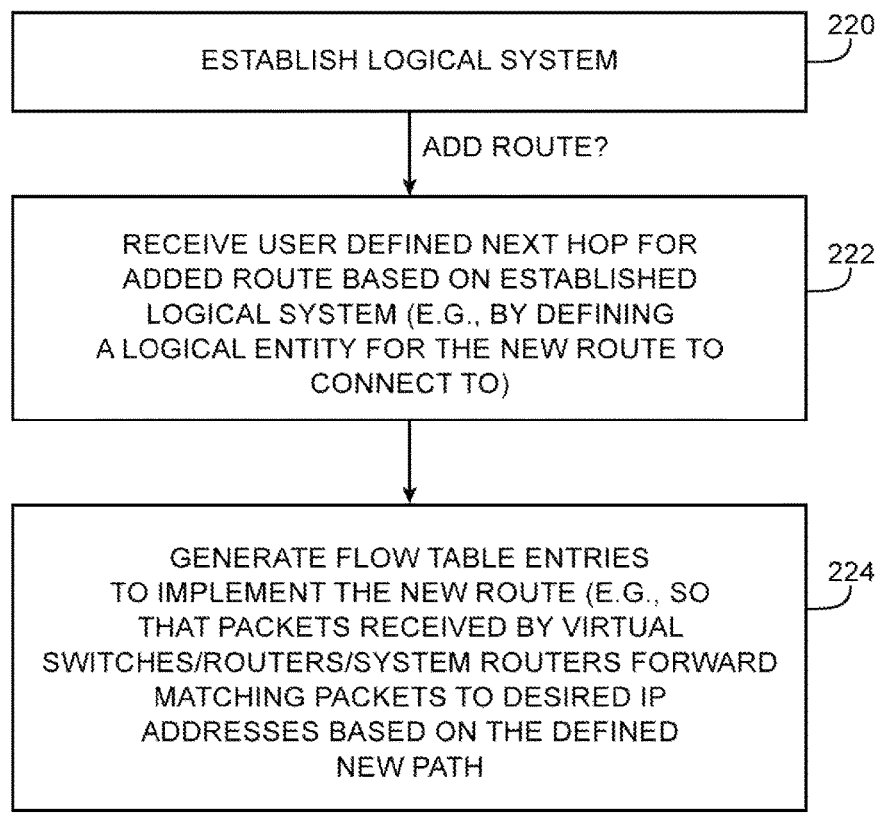
FIG. 15 is a flow chart of illustrative steps that may be performed by a controller for adding and implementing new network routes to a virtual network topology of the type shown in FIG. 8 in accordance with an embodiment of the present invention.

In some scenarios, it may be desirable to add new network routes (paths) to virtual system 120 (e.g., to add new paths to system 120 after system 120 has been generated by controller 18). FIG. 15 shows a flow chart of illustrative steps that may be performed by controller 18 to add logical routes to logical system 120 (as shown in FIG. 8).

At step 220, controller 18 may set up and establish logical system 120 by generating and identifying virtual switches, virtual routers, and virtual system routers (e.g., by performing the steps of FIG. 14). When it is desired to add a new logical route between entities in the logical fabric 120 (e.g., when a user desired to add a new logical route to the logical fabric), processing may proceed to step 222.

At step 222, controller 18 may receive a user defined source and "next hop" destination for the new route (e.g., for adding a logical route between the source and the next hop destination). The next hop destination may be provided by the user and received by the controller based on the configuration of logical fabric 120. For example, the user may define a logical entity on fabric 120 to which the new route is to be added (e.g., to a desired virtual router or virtual system router) and may define the set of network packets to be provided with the new route (e.g., a set of matching rules to match to network packets received by the logical entity so that only packets matching those rules are forwarded to the new route).

If desired, the user may define the next hop destination as a logical object and may subsequently define the logical object. For example, the controller may receive a user input identifying virtual router VR1 as a source and a logical object "A" as the next-hop destination for the new route. The controller may subsequently receive a user input defining the logical object "A" using a desired IP address (e.g., the user may define the logical object "A" as a single IP address as the next hop destination or may define the logical object "A" as multiple IP address as the next hop destination so that packets forwarded to the next hop destination from the source may be load balanced across the multiple IP addresses).

At step 224, controller 18 may generate flow table entries that implement the added route (e.g., such that packets received by the virtual switches, virtual routers, and/or virtual system routers forward matching packets to the desired next-hop destination based on the defined new route).

Figure 16:
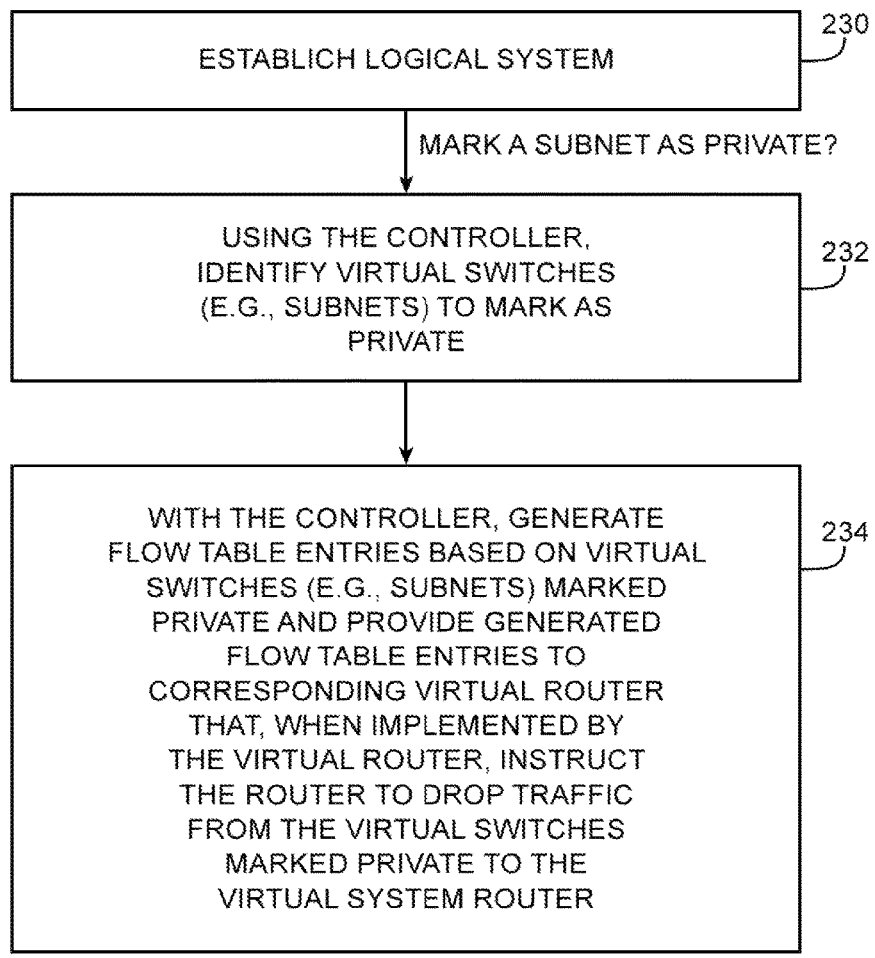
FIG. 16 is a flow chart of illustrative steps that may be performed by a controller in marking portions of a virtual network topology as private for restricting communications by the private portion over a virtual system router in the virtual network topology in accordance with an embodiment of the present invention.

If desired, controller 18 may mark portions of logical system 120 (e.g., one or more subnets) as "private" network portions so that the private network portions are restricted from communicating across interfaces of virtual system router SR1. FIG. 16 shows a flow chart of illustrative steps that may be performed by controller 18 to mark portions of logical system 120 as private.

At step 230, controller 18 may set up and establish logical system 120 by generating and identifying virtual switches, virtual routers, and virtual system routers (e.g., by performing the steps of FIG. 14). When it is desired to mark a portion of system 120 as private, processing may proceed to step 232. For example, a network administrator may desire to make portions of system 120 private portions that are restricted from communicating across interfaces of virtual system router SR1.

At step 232, controller 18 may identify virtual switches (e.g., subnets) to mark as private. Controller 18 may identify subnets to mark as private based on the IP address ranges used to define the subnets (e.g., when establishing the logical system during processing of step 230). If desired, controller 18 may mark subnets having an IP address that overlaps with another IP address associated with virtual system router SR1 as private.

In general, IP address ranges in the subnets of a given virtual router may not overlap (e.g., subnet SUBNET1 of FIG. 8 may not include any IP addresses that are also in SUBNET2). However, one or more subnets of a given virtual router may include IP address ranges that overlap with subnets connected to other virtual routers in system 120 (e.g., the IP addresses in a subnet assigned to a first virtual system router interface may overlap with the IP addresses in a subnet assigned to a second virtual system router interface). As one example, in the logical system shown in FIG. 8, subnet SUBNET1 may include IP addresses $IP_A$, $IP_B$, and $IP_C$, subnet SUBNET2 may include IP addresses $IP_D$ and $IP_E$, and subnet SUBNET3 associated with system router interface IFSR2 may include IP addresses $IP_E$ and $IP_F$. In this example, SUBNET2 associated with virtual system router interface IFSR1 includes overlapping (common) IP addresses with subnet SUBNET3 associated with virtual system router interface IFSR2 (e.g., SUBNET2 and SUBNET3 both include an end host having an IP address of $IP_E$). Controller 18 may thereby mark SUBNET 2 as a private subnet to restrict communication between the end hosts in SUBNET2 and other virtual system router interfaces.

At step 234, controller 18 may generate network forwarding rules such as flow table entries based on the portions of logical fabric 120 that have been marked private. Controller 18 may provide the flow table entries to the virtual routers.

When implemented, the flow table entries may instruct the virtual router to drop all traffic destined for other interfaces of virtual system router SR1 from the virtual switches marked private (e.g., packets received from the virtual switches or the virtual router interfaces that were marked private). In the scenario where SUBNET2 is marked private, virtual router VR1 may, for example, drop all traffic received over interface IF2 (e.g., from the end hosts of virtual switch VSW2) that has a destination in virtual router VR2 (or any destination coupled to an interface of virtual system router SR1 other than interface IFSR1). Virtual router VR1 may continue to route traffic between the subnet marked private and other virtual switches coupled to virtual router VR1 (e.g., between SUBNET2 and SUBNET1) without dropping the traffic (e.g., the subnet marked private may be restricted from communicating with other virtual routers but may continue to communicate within the corresponding virtual router). In this way, a user may implement particular IP addresses multiple times in system 120, even when there are only a limited number of IP addresses available.

In scenarios where the logical switch fabric is implemented over an underlying rack-based network, virtual system routers such as system router SR1, virtual routers such as routers VR1 and VR2, and virtual switches such as switches VSW1, VSW2, and VSW3 may be implemented on any desired combination of spine and leaf switches. If desired, controller 18 may isolate traffic that travels over the spine switches in a rack-based implementation of logical system 120 based on whether the traffic is being forwarded within a virtual switch, virtual router, or virtual system router in the logically defined topology when traversing the spine switch. For example, controller 18 may isolate the traffic by assigning reserved VLAN tags to the data packets (e.g., a first reserved VLAN tag may be assigned to traffic forwarded within a virtual switch when traversing the physical spine switch, a second reserved VLAN tag may be assigned to traffic within a virtual router when traversing the physical spine switch, and a third reserved VLAN tag may be assigned to traffic forwarded within a virtual system router when traversing the physical spine switch). In general, any desired isolation scheme may be used.

Consider, for example, the scenario in which system 120 of FIG. 8 is implemented on the rack-based network shown in FIG. 7. In this example, end host EH1 located in rack 110 may send network packets destined for end host EH3 located in rack 112. On the physical network, the packet may be forwarded through a spine switch (e.g., switch C1 or C2) and on the logical system implemented over the physical network, the packet may be forwarded within virtual router VR1 (e.g., from a second interface IF2 of virtual router VR2 to a first interface IF1 of virtual router VR2). The packets forwarded between end host EH1 and EH3 may thereby be provided with a first reserved VLAN tag to isolate the packet from other traffic forwarded over spine switches C1 and C2 (e.g., using the virtual switches, virtual routers, and/or virtual system routers based on control messages provided by controller 18).

Similarly, end host EH1 in rack 110 may send network packets destined for external physical router 67, which may be located in rack 112. On the physical network, the packet may be forwarded through spine switches C1 or C2 and on the logical system the packet may be forwarded within virtual switch VSW2 (e.g., from a first virtual switch port coupled to end host EH1 to a second virtual switch port coupled to physical router 67). The packets forwarded between end host EH2 and physical router 67 may thereby be provided with a second reserved VLAN tag to isolate the packet from the packets forwarded between end hosts EH1 and EH3. In addition, end host EH1 in rack 110 may send network packets destined for end host EH4 located in rack 112. On the physical network, the packet may be forwarded through spine switches C1 or C2 and on the logical system the packet may be forwarded within virtual system router SR1 (e.g., from a first virtual system router interface IFSR1 to a second virtual system router interface IFSR2). The packets forwarded between end hosts EH1 and EH4 may thereby be provided with a third reserved VLAN tag to isolate the packets from the packets forwarded between end hosts EH1 and EH3 (e.g., within virtual router VR1) and the packets forwarded between end host EH1 and physical router 67 (e.g., within virtual switch VSW2). In this way, traffic over a single underlying spine switch may be isolated based on the logical topology of logical system 120.

The foregoing is merely illustrative of the principles of this invention and various modifications can be made by those skilled in the art without departing from the scope and spirit of the invention.

What is claimed is:

1. A method of using a controller that controls dedicated switches in a network having end hosts that are coupled to the dedicated switches, the method comprising:
   with the controller, forming a plurality of virtual switches from respective groups of end hosts, wherein at least one virtual switch includes ports from at least two dedicated switches in the network, wherein a given dedicated switch of the at least two dedicated switches is a dedicated physical switch, wherein ports from the dedicated physical switch are directly connected to one or more end hosts in the network and the dedicated physical switch is formed separately from the one or more end hosts;
   with the controller, forming a plurality of virtual routers from respective groups of the virtual switches by forming at least one virtual router to include the at least one virtual switch that includes the ports from the at least two dedicated switches in the network, wherein the virtual routers perform network routing operations; and
   with the controller, forming a virtual system router from a group of the virtual routers that includes the least one virtual router, wherein the virtual system router performs additional network routing operations directly between only the plurality of virtual routers.

2. The method defined in claim 1 wherein the dedicated switches comprise at least one additional dedicated physical switch.

3. The method defined in claim 2 wherein the dedicated switches further comprise at least one hypervisor switch.

4. The method defined in claim 1, wherein the at least one virtual router comprises first and second virtual routers, the method further comprising:
   with the controller, receiving a network policy that identifies at least one source end host and at least one destination end host; and
   with the controller, directing the network packets between the source end host and the destination end host through the first and second virtual routers in the plurality of virtual routers and through the virtual system router by controlling the first and second virtual routers and the virtual system router.

5. The method defined in claim 4 wherein the network packets have Ethernet address fields and wherein directing the network packets from the source end host to the destination end host comprises:

controlling the dedicated switches to send first network packets from the source end host to the first virtual router; and controlling the dedicated switches to send first modified network packets from the first virtual router to the virtual system router by rewriting the Ethernet address fields of the first network packets.

6. The method defined in claim 5 wherein directing the network packets from the source end host to the destination end host further comprises:

controlling the dedicated switches to send second modified network packets from the virtual system router to the second virtual router by rewriting the Ethernet address fields of the first modified network packets; and controlling the dedicated switches to send third modified network packets from the second virtual router to the destination end host by rewriting the Ethernet address fields of the second modified network packets.

7. The method defined in claim 1, further comprising:

with the controller, receiving a first set of network policies and generating a first set of flow table entries based on the first set of network policies;

with the controller, receiving a second set of network policies and generating a second set of flow table entries based on the second set of network policies;

with the controller, providing the first set of flow table entries to the virtual system router; and with the controller, providing the second set of flow table entries to the at least one virtual router.

8. The method defined in claim 7, further comprising:

with the controller, receiving a third set of network policies and generating a third set of flow table entries based on the third set of network policies; and with the controller, providing the third set of flow table entries to the at least one virtual switch.

9. The method defined in claim 8, wherein a given one of the first and second sets of network policies comprise an access control list that specifies whether a given end host associated with a given virtual switch is permitted to send packets to an additional end host over the given virtual switch.

10. The method defined in claim 1, further comprising:

directly connecting a given virtual switch to a physical router coupled to an external network.

11. The method defined in claim 10, further comprising:

controlling one or more of the virtual switches and one or more virtual routers to forward network traffic to and from the external network via the physical router.

12. A method of using a controller that controls switches in a network having end hosts that are coupled to the switches, the method comprising:

with the controller, forming a first virtual switch from a first group of end hosts;

with the controller, forming a second virtual switch from a second group of end hosts, wherein at least one of the first and second virtual switches includes ports from at least two different switches;

with the controller, directly connecting the second virtual switch to a physical router;

with the controller, forming a virtual router from the first and second virtual switches, wherein the virtual router performs network routing operations;

with the controller, forming a virtual system router from a plurality of virtual routers that includes the virtual router, wherein the virtual system router performs additional network routing operations directly between only the plurality of virtual routers; and with the controller, controlling the first and second virtual switches and the virtual router to forward a network packet from a given end host to an external network through the physical router.

13. The method defined in claim 12, wherein the virtual router has a first interface having a first Ethernet address and a second interface having a second Ethernet address, wherein controlling the first and second virtual switches and the virtual router to forward the network packet comprises:

controlling the virtual router to route the network packet from the first interface to the second interface.

14. The method defined in claim 12, further comprising:

with the controller, forming a third virtual switch from a third group of end hosts;

with the controller, forming a second virtual router from at least the third virtual switch; and with the controller, identifying the second virtual switch as a private virtual switch.

15. The method defined in claim 14, further comprising:

with the controller, controlling the first virtual router so that network packets generated by the second group of end hosts having destination address fields identifying the third group of end hosts are dropped; and with the controller, controlling the first virtual router to forward network packets generated by the second group of end hosts having destination address fields identifying the first group of end hosts to the first group of end hosts.

16. The method defined in claim 12, the method further comprising:

with the controller, forming a third virtual switch from a third group of end hosts;

with the controller, forming a second virtual router from at least the third virtual switch;

with the controller, forming the virtual system router from the first and second virtual routers; and with the controller, providing first control messages to the virtual router and providing second control messages to the virtual system router.

17. A method of using a controller that controls switches in a network having end hosts that are coupled to the switches, the method comprising:

with the controller, generating a virtual topology for the network that includes a plurality of virtual switches, a plurality of virtual routers, and at least one virtual system router, wherein the virtual switches, virtual routers, and virtual system router are distributed over and formed from at least a plurality of underlying dedicated switches in the switches in the network, wherein the virtual switches have virtual ports that are coupled to the end hosts, wherein a given port of the virtual ports is directly connected to an external network router, wherein the virtual routers have virtual interfaces that are coupled to the virtual switches, and wherein the virtual system router has virtual system router interfaces that are only coupled to the virtual routers; and with the controller, forwarding network packets to an external network outside of the network through the given port and the external network router.

18. The method defined in claim 17, further comprising:

with the controller, controlling the virtual system router to route additional network packets only between virtual routers in the plurality of virtual routers over corresponding virtual system router interfaces.

19. The method defined in claim 17, wherein the switches and the end hosts are arranged in a rack-based network system having leaf switches that are coupled to the end hosts and spine switches that are coupled to each of the leaf switches, the method comprising:

- with the controller, implementing the virtual system router on at least one of the spine switches by providing first flow table entries to the spine switches; and
- with the controller, implementing each of the virtual routers on at least one of the leaf switches by providing second flow table entries to the leaf switches.

20. The method defined in claim 19, wherein implementing the virtual system router on at least one of the spine switches comprises implementing the virtual system router only on the spine switches.

21. The method defined in claim 17, further comprising:
- with the controller, controlling a given virtual router in the plurality of the virtual routers to generate an Address Resolution Protocol (ARP) request packet and to provide the ARP request packet to a given one of the end hosts via a corresponding virtual switch; and
- with the controller, controlling the given one of the virtual routers to receive an ARP response packet and to resolve an Ethernet address of the given one of the end hosts based on the received ARP response packet.

22. The method defined in claim 17, further comprising:
- with the controller, configuring a given one of the virtual routers to generate an Internet Control Message Protocol (ICMP) packet and to provide the ICMP packet to a given one of the end hosts over a corresponding virtual switch.

* * * * *